(12) United States Patent
Weiner et al.

(10) Patent No.: US 9,781,105 B2
(45) Date of Patent: Oct. 3, 2017

(54) FALLBACK IDENTITY AUTHENTICATION TECHNIQUES

(71) Applicant: Ping Identity Corporation, Denver, CO (US)

(72) Inventors: Avish Jacob Weiner, Tel Aviv (IL); Ran Ne'Man, Ramat Gan (IL)

(73) Assignee: Ping Identity Corporation, Denver, CO (US)

( * ) Notice: Subject to any disclaimer, the term of this patent is extended or adjusted under 35 U.S.C. 154(b) by 0 days.

(21) Appl. No.: 14/703,189

(22) Filed: May 4, 2015

(65) Prior Publication Data

US 2016/0330199 A1 Nov. 10, 2016

(51) Int. Cl.
*H04L 29/06* (2006.01)

(52) U.S. Cl.
CPC ...... *H04L 63/0853* (2013.01); *H04L 63/0861* (2013.01); *H04L 63/18* (2013.01)

(58) Field of Classification Search
CPC ..................................................... G06F 21/31
See application file for complete search history.

(56) References Cited

U.S. PATENT DOCUMENTS

| | | | |
|---|---|---|---|
| 5,420,606 A | 5/1995 | Begum et al. | |
| 5,559,961 A | 9/1996 | Blonder | |
| 5,875,394 A | 2/1999 | Daly et al. | |
| 5,892,900 A | 4/1999 | Ginter et al. | |
| 5,903,721 A | 5/1999 | Sixtus | |
| 5,991,407 A | 11/1999 | Murto | |
| 6,082,620 A | 7/2000 | Bone, Jr. | |
| 6,338,140 B1 | 1/2002 | Owens et al. | |
| 6,510,502 B1 | 1/2003 | Shimizu | |
| 6,584,309 B1 | 6/2003 | Whigham | |
| 6,687,346 B1 | 2/2004 | Swartz et al. | |
| 6,705,517 B1 | 3/2004 | Zajkowski et al. | |
| 7,028,906 B2 | 4/2006 | Challa et al. | |
| 7,137,006 B1 | 11/2006 | Grandcolas et al. | |

(Continued)

FOREIGN PATENT DOCUMENTS

| | | |
|---|---|---|
| CN | 1533088 A | 9/2004 |
| CN | 101583968 A | 11/2009 |

(Continued)

OTHER PUBLICATIONS

Supplementary European Search Report for European Application No. 11731739.6, mailed Aug. 7, 2013, 7 pages.

(Continued)

*Primary Examiner* — Harunur Rashid
*Assistant Examiner* — Thanh Le

(57) ABSTRACT

The presently disclosed subject matter includes a system, a method and a non-transitory program storage device configured for authorizing access of a user device to a service provider server. Responsive to a request to authenticate the identity of a user attempting to access an SP server via a user device (UD), an authentication server is configured to initiate at least one authentication operation using a second UD; in the event of a failure to receive a response to the at least one authentication operation from the second UD, the authentication server is configured to proceed according to an alternative authentication method which does not involve the second UD.

32 Claims, 11 Drawing Sheets

(56) References Cited

U.S. PATENT DOCUMENTS

| | | | |
|---|---|---|---|
| 7,347,361 B2 | 3/2008 | Lovett | |
| 7,356,510 B2 | 4/2008 | Durand et al. | |
| 7,392,226 B1 | 6/2008 | Sasaki et al. | |
| 7,509,119 B2 | 3/2009 | Eonnet | |
| 7,529,710 B1 | 5/2009 | Clower et al. | |
| 7,706,784 B2 | 4/2010 | Weiner et al. | |
| 7,774,231 B2 | 8/2010 | Pond et al. | |
| 7,778,840 B2 | 8/2010 | Krause et al. | |
| 7,962,762 B2 | 6/2011 | Kirsch et al. | |
| 8,032,927 B2 | 10/2011 | Ross | |
| 8,108,318 B2 | 1/2012 | Mardikar | |
| 8,185,956 B1 | 5/2012 | Bogorad et al. | |
| 8,244,211 B2 | 8/2012 | Clark | |
| 8,306,879 B2 | 11/2012 | Nonaka | |
| 8,346,672 B1 | 1/2013 | Weiner et al. | |
| 8,443,191 B2 | 5/2013 | Beckwith et al. | |
| 8,453,940 B2 | 6/2013 | Diamond | |
| 8,479,022 B2 | 7/2013 | Dahan et al. | |
| 8,494,961 B1 * | 7/2013 | Lucas et al. | 705/43 |
| 8,510,820 B2 | 8/2013 | Oberheide et al. | |
| 8,578,454 B2 | 11/2013 | Grim | |
| 8,736,424 B2 | 5/2014 | Shoarinejad et al. | |
| 8,739,259 B1 | 5/2014 | Kumar et al. | |
| 8,763,077 B2 | 6/2014 | Oberheide et al. | |
| 8,805,434 B2 | 8/2014 | Vasudevan | |
| 8,887,257 B2 | 11/2014 | Haggerty et al. | |
| 9,098,850 B2 | 8/2015 | Weiner et al. | |
| 9,196,111 B1 | 11/2015 | Newman et al. | |
| 2001/0014870 A1 | 8/2001 | Saito et al. | |
| 2002/0023027 A1 | 2/2002 | Simonds | |
| 2002/0028671 A1 | 3/2002 | I'Anson et al. | |
| 2002/0042722 A1 | 4/2002 | Tsuji et al. | |
| 2002/0059142 A1 | 5/2002 | Krause et al. | |
| 2002/0091569 A1 | 7/2002 | Kitaura et al. | |
| 2002/0198777 A1 | 12/2002 | Yuasa | |
| 2003/0047613 A1 | 3/2003 | Funamoto et al. | |
| 2003/0115150 A1 | 6/2003 | Hamilton et al. | |
| 2003/0149663 A1 | 8/2003 | Vonholm et al. | |
| 2003/0163384 A1 | 8/2003 | Hendra | |
| 2003/0163567 A1 | 8/2003 | McMorris et al. | |
| 2003/0193441 A1 | 10/2003 | Zimmerman et al. | |
| 2003/0225618 A1 | 12/2003 | Hessburg et al. | |
| 2004/0059909 A1 | 3/2004 | Le Pennec et al. | |
| 2004/0117254 A1 | 6/2004 | Nemirofsky et al. | |
| 2004/0117262 A1 | 6/2004 | Berger et al. | |
| 2004/0121781 A1 | 6/2004 | Sammarco | |
| 2004/0186768 A1 | 9/2004 | Wakim et al. | |
| 2004/0243519 A1 | 12/2004 | Perttila et al. | |
| 2005/0071673 A1 | 3/2005 | Saito | |
| 2005/0091539 A1 | 4/2005 | Wang et al. | |
| 2005/0120213 A1 | 6/2005 | Winget et al. | |
| 2005/0165684 A1 | 7/2005 | Jensen et al. | |
| 2005/0166060 A1 | 7/2005 | Goldthwait et al. | |
| 2005/0242921 A1 | 11/2005 | Zimmerman et al. | |
| 2005/0254514 A1 | 11/2005 | Lynn | |
| 2005/0255889 A1 | 11/2005 | Haseba et al. | |
| 2005/0258237 A1 | 11/2005 | Urakami et al. | |
| 2006/0044115 A1 | 3/2006 | Doi et al. | |
| 2006/0089912 A1 | 4/2006 | Spagna et al. | |
| 2006/0165060 A1 | 7/2006 | Dua | |
| 2006/0174322 A1 | 8/2006 | Turner et al. | |
| 2006/0174332 A1 | 8/2006 | Bauban et al. | |
| 2006/0230145 A1 | 10/2006 | Zarakhovsky et al. | |
| 2006/0235796 A1 | 10/2006 | Johnson et al. | |
| 2006/0237528 A1 | 10/2006 | Bishop et al. | |
| 2006/0271643 A1 | 11/2006 | Stallman | |
| 2007/0055749 A1 | 3/2007 | Chien | |
| 2007/0088950 A1 | 4/2007 | Wheeler et al. | |
| 2007/0107044 A1 | 5/2007 | Yuen et al. | |
| 2007/0156436 A1 | 7/2007 | Fisher et al. | |
| 2007/0192245 A1 | 8/2007 | Fisher et al. | |
| 2007/0194123 A1 | 8/2007 | Frantz et al. | |
| 2007/0202894 A1 | 8/2007 | Dhebri et al. | |
| 2007/0214155 A1 | 9/2007 | Chang et al. | |
| 2007/0255653 A1 | 11/2007 | Tumminaro et al. | |
| 2008/0028228 A1 | 1/2008 | Mardikar et al. | |
| 2008/0084272 A1 | 4/2008 | Modiano | |
| 2008/0097925 A1 | 4/2008 | King | |
| 2008/0147546 A1 | 6/2008 | Weichselbaumer et al. | |
| 2008/0208759 A1 | 8/2008 | Royyuru | |
| 2008/0210754 A1 | 9/2008 | Lovett | |
| 2008/0222031 A1 | 9/2008 | Shattner et al. | |
| 2008/0227471 A1 | 9/2008 | Dankar et al. | |
| 2008/0307515 A1 | 12/2008 | Drokov et al. | |
| 2009/0044025 A1 | 2/2009 | She | |
| 2009/0062939 A1 | 3/2009 | Park | |
| 2009/0119190 A1 | 5/2009 | Realini | |
| 2009/0138366 A1 | 5/2009 | Bemmel et al. | |
| 2009/0165121 A1 | 6/2009 | Kumar | |
| 2009/0233579 A1 | 9/2009 | Castell et al. | |
| 2009/0235178 A1 | 9/2009 | Cipriani et al. | |
| 2009/0249439 A1 | 10/2009 | Olden et al. | |
| 2009/0287565 A1 | 11/2009 | Bishop et al. | |
| 2009/0288012 A1 | 11/2009 | Hertel et al. | |
| 2009/0305725 A1 | 12/2009 | Shin et al. | |
| 2010/0031349 A1 | 2/2010 | Bingham | |
| 2010/0049615 A1 | 2/2010 | Rose et al. | |
| 2010/0057843 A1 | 3/2010 | Landsman et al. | |
| 2010/0114776 A1 | 5/2010 | Weller et al. | |
| 2010/0144314 A1 | 6/2010 | Sherkin et al. | |
| 2010/0146263 A1 | 6/2010 | Das et al. | |
| 2010/0161410 A1 | 6/2010 | Tulloch | |
| 2010/0199086 A1 | 8/2010 | Kuang et al. | |
| 2010/0262830 A1 | 10/2010 | Kusakawa et al. | |
| 2010/0268618 A1 | 10/2010 | McQuilken | |
| 2010/0318801 A1 | 12/2010 | Roberge et al. | |
| 2011/0022484 A1 | 1/2011 | Smith et al. | |
| 2011/0070901 A1 | 3/2011 | Alward | |
| 2011/0078081 A1 | 3/2011 | Pirzadeh et al. | |
| 2011/0131419 A1 | 6/2011 | Dowds et al. | |
| 2011/0137804 A1 | 6/2011 | Peterson | |
| 2011/0219230 A1 | 9/2011 | Oberheide et al. | |
| 2011/0251892 A1 | 10/2011 | Laracey | |
| 2011/0251955 A1 | 10/2011 | Lam | |
| 2012/0005026 A1 | 1/2012 | Khan et al. | |
| 2012/0011058 A1 | 1/2012 | Pitroda et al. | |
| 2012/0130714 A1 | 5/2012 | Zeljkovic et al. | |
| 2012/0144461 A1 | 6/2012 | Rathbun | |
| 2012/0185932 A1 | 7/2012 | Stougaard et al. | |
| 2012/0198228 A1 | 8/2012 | Oberheide et al. | |
| 2012/0303528 A1 | 11/2012 | Weiner et al. | |
| 2012/0331536 A1 | 12/2012 | Chabbewal et al. | |
| 2013/0023240 A1 | 1/2013 | Weiner et al. | |
| 2013/0046976 A1 * | 2/2013 | Rosati et al. | 713/168 |
| 2013/0054320 A1 | 2/2013 | Dorso et al. | |
| 2013/0204690 A1 | 8/2013 | Liebmann | |
| 2013/0212387 A1 | 8/2013 | Oberheide et al. | |
| 2013/0267200 A1 | 10/2013 | Weiner et al. | |
| 2014/0013387 A1 | 1/2014 | Vangpat et al. | |
| 2014/0040149 A1 | 2/2014 | Fiske | |
| 2014/0067509 A1 | 3/2014 | Weiner | |
| 2014/0114846 A1 | 4/2014 | Weiner | |
| 2014/0164253 A1 | 6/2014 | Dominguez | |
| 2014/0214688 A1 | 7/2014 | Weiner et al. | |
| 2014/0236834 A1 | 8/2014 | Appalsamy | |
| 2014/0282961 A1 * | 9/2014 | Dorfman et al. | 726/7 |
| 2014/0376385 A1 * | 12/2014 | Boss | H04L 43/0811 370/242 |
| 2015/0073992 A1 | 3/2015 | Weiner et al. | |
| 2015/0142589 A1 | 5/2015 | Jin et al. | |
| 2015/0304850 A1 | 10/2015 | Weiner et al. | |

FOREIGN PATENT DOCUMENTS

| | | | |
|---|---|---|---|
| CN | 101916487 A | 12/2010 | |
| CN | 102057385 A | 5/2011 | |
| EP | 1424861 | 6/2004 | |
| EP | 1460573 | 9/2004 | |
| EP | 2611097 * | 3/2013 | H04L 29/06 |
| FR | 2832829 | 5/2003 | |
| GB | 2460304 | 12/2009 | |
| JP | H10-145354 A | 5/1998 | |
| JP | 2001-084311 | 3/2001 | |
| JP | 2005-173982 | 6/2005 | |

(56) References Cited

FOREIGN PATENT DOCUMENTS

| | | |
|---|---|---|
| JP | 2005-215849 | 8/2005 |
| JP | 2005-276025 | 10/2005 |
| JP | 2005-533316 | 11/2005 |
| JP | 2006-014159 | 1/2006 |
| JP | 2006-171855 A | 6/2006 |
| JP | 2006-197458 A | 7/2006 |
| JP | 2006-221351 | 8/2006 |
| JP | 2006-338638 | 12/2006 |
| JP | 2006-350450 | 12/2006 |
| JP | 2007-188150 | 7/2007 |
| JP | 2007-280363 | 10/2007 |
| JP | 2008-210368 | 9/2008 |
| JP | 2008-287321 A | 11/2008 |
| JP | 2009-058637 | 3/2009 |
| JP | 2009-193155 | 8/2009 |
| JP | 2010-009161 | 1/2010 |
| JP | 2010-231777 | 10/2010 |
| JP | 2010-250374 | 11/2010 |
| JP | 2011-002994 A | 1/2011 |
| JP | 2011-053767 | 3/2011 |
| WO | WO 98/34421 | 8/1998 |
| WO | WO 01/73580 | 10/2001 |
| WO | WO 02/08981 | 1/2002 |
| WO | WO 02/19199 | 3/2002 |
| WO | WO 02/42926 | 5/2002 |
| WO | WO 02/060209 | 8/2002 |
| WO | WO 02/102099 | 12/2002 |
| WO | WO 03/027937 | 4/2003 |
| WO | WO 03/046847 | 6/2003 |
| WO | WO 2006/090392 | 8/2006 |
| WO | WO 2006/102848 | 10/2006 |
| WO | WO 2007/021658 | 2/2007 |
| WO | WO 2007/048976 | 5/2007 |
| WO | WO 2007/106906 | 9/2007 |
| WO | WO 2007/117073 | 10/2007 |
| WO | WO 2008/027620 | 3/2008 |
| WO | WO 2009/032687 | 3/2009 |
| WO | WO 2009/113057 | 9/2009 |
| WO | WO 2009/156880 | 12/2009 |
| WO | WO 2010/087535 | 8/2010 |
| WO | WO 2010/111023 | 9/2010 |
| WO | WO 2010/120222 | 10/2010 |
| WO | WO 2010/140876 | 12/2010 |
| WO | WO 2011/074500 | 6/2011 |
| WO | WO 2011/083471 | 7/2011 |
| WO | WO 2012/156977 | 11/2012 |
| WO | WO 2012/168940 | 12/2012 |
| WO | WO 2013/030832 | 3/2013 |
| WO | WO 2013/153552 | 10/2013 |

OTHER PUBLICATIONS

Office Action for U.S. Appl. No. 13/520,185, mailed Jul. 9, 2015.
Final Office Action for U.S. Appl. No. 13/520,185, mailed Jan. 6, 2016.
International Search Report and Written Opinion for International Application No. PCT/IL2011/00015, mailed May 23, 2011, 7 pages.
International Search Report and Written Opinion for International Application No. PCT/IL2012/050178, mailed Sep. 17, 2012, 8 pages.
International Search Report and Written Opinion for International Application No. PCT/IL2012/050199, mailed Sep. 26, 2012.
Office Action for U.S. Appl. No. 14/240,395, mailed Aug. 31, 2015, 23 pages.
International Search Report and Written Opinion for International Application No. PCT/IL2012/050328, mailed Dec. 21, 2012.
International Search Report and Written Opinion for International Application No. PCT/IL2013/050318, mailed Jul. 31, 2013.
International Search Report and Written Opinion for International Application No. PCT/IL2009/000263, mailed Jul. 6, 2009.
Office Action for U.S. Appl. No. 13/731,028, mailed Nov. 5, 2015.
Office Action for U.S. Appl. No. 13/625,148, mailed Apr. 10, 2014.
Office Action for U.S. Appl. No. 13/625,148, mailed Jun. 14, 2013.
Office Action for U.S. Appl. No. 13/625,148, mailed Jan. 10, 2014.
Office Action for U.S. Appl. No. 14/755,707, mailed Oct. 21, 2015.
Latze, C. et al., "A Proof of Concept Implementation of a Secure E-Commerce Authentication Scheme," Jul. 2009, Information Security South Africa, Johannesberg, South Africa, retrieved from Internet on Jun. 25, 2012 from http://www.latze.ch/latze-ruppen-ultesnitsche.pdf.
McHeck Brochure, Retrieved from Internet on Jun. 25, 2012 from http://main.mchek.com/pdf/mchek-brochure.pclf.
Gao, J. et al., "P2P-Paid: A Peer-to-Peer Wireless Payment System," Proceedings of the 2005 Second IEEE International Workshop on Mobile Commerce and Services (WMCS'05), Institute of Electrical and Electronics Engineers (2005).
Carr, "Mobile Payment Systems and Services: An Introduction," 2007, Retrieved from Internet on Jun. 25, 2012 from http://www.mpf.org.in/pdf/Mobile%20Payment%20Systems%20and%20Services.pdf.
"Mobile Payment," Wikipedia, the free encyclopedia, Accessed Jan. 20, 2010.
Fun et al., "Privacy in New Mobile Payment Protocol," World Academy of Science, Engineering and Technology, 2008, issue 47, pp. 443-447.
Screen Shot of web site of Mobiqa Airlines, Retrieved from the Internet on Dec. 9, 2009 from http://www.mobiqa.com/airlines/?gclid=CLqyxOefyZ4CFW1r4wodbx7wrg.
"IPCS & barcode enabling mobile payment," Retrieved from the Internet on Jun. 25, 2012 from http://www.ipcslive.com/pdf/IPCSbar.pcif.
Weiss, M., "Performing Relay Attacks on ISO 14443 Contactless Smart Cards using NFC Mobile Equipment,", Master's Thesis in Computer Science, University of Munich, Germany, May 17, 2010.
Mulliner, C., "Vulnerability Analysis and Attacks on NFC-enabled Mobile Phones," 2009 International Conference on Availability, Reliability and Security, pp. 695-700, Institute of Electrical and Electronic Engineers (2009).
Mulliner, "Attacking NFC Mobile Phones," 25th Chaos Communication Congress, Dec. 2008, Berlin, Germany.
"Is NFC too Slow?", Insight-Driven Retailing Blog, ORACLE, Retrieved from the Internet on May 15, 2011.
Heine, "GSM Networks: Protocolas, Terminology, and Implementation", 1999, pp. 116 and 328, Artech House, Inc., Norwood, MA.
Newton'S Telecom Dictionary, Jul. 2010, 'Mixed Mode'-'MNA', CMP Books, Gilroy, CA.
Miller, C. C., "Payment Method Bypasses the Wallet," The New York Times Reprint, May 23, 2011.
Vamosi et al., "Multi-Channel Authentication Via Mobile Banking," Javelin Strategy & Research, Sep. 2009, Pleasanton, CA.
Office Action for U.S. Appl. No. 14/118,232, mailed Apr. 21, 2016.
First Office Action for Chinese Application No. 201280035348.3, mailed Jan. 29, 2016.
Office Action for Japanese Application No. 2014-510948, mailed Jun. 28, 2016.
Office Action for Japanese Application No. 2014-514222, mailed May 24, 2016.
Office Action for U.S. Appl. No. 14/124,719, mailed Jun. 16, 2016.
Final Office Action for U.S. Appl. No. 14/240,395, mailed Apr. 7 2016.
Office Action for Japanese Application No. 2014-527810, mailed Apr. 26, 2016.
Final Office Action for U.S. Appl. No. 13/731,028, mailed Jun. 8, 2016.
Office Action for U.S. Appl. No. 14/511,751, mailed May 17, 2016.
Final Office Action for U.S. Appl. No. 14/755,707, mailed May 12, 2016.
Shirali-Shahreza, Mohammed et al. "Drawing CAPTCHA," 28th International Conference on Information Technology Interfaces, 2006, pp. 475-480, DOI: 10.1109/ITI.2006.1708527.
Office Action for U.S. Appl. No. 13/520,185, mailed Jul. 29, 2016.
Office Action for U.S. Appl. No. 13/520,185, mailed Feb. 10, 2017.
Office Action for U.S. Appl. No. 14/118,232, mailed Nov. 14, 2016.
Final Office Action for U.S. Appl. No. 14/124,719, mailed Jan. 30, 2017.

(56) References Cited

OTHER PUBLICATIONS

Office Action for U.S. Appl. No. 14/240,395, mailed Oct. 20, 2016.
Office Action for U.S. Appl. No. 13/731,028, mailed Nov. 9, 2016.
Final Office Action for U.S. Appl. No. 14/511,751, mailed Dec. 19, 2016.
Office Action for U.S. Appl. No. 14/755,707, mailed Nov. 17, 2016.
Dan Balaban, "Pioneering NFC Provider Service Provider Adds Bar Codes to New NFC Trial," available on May 8, 2010, retrieved <http://www.nfctimes.com/news/pioneering-nfc-service-provider-adds-bar-codes-new-nfc-trial>.
Office Action for Israeli Application No. 229881, dated Mar. 20, 2017, 2 pages.
Final Office Action for U.S. Appl. No. 14/240,395, mailed Mar. 30, 2017.
Office Action for Japanese Application No. 2014-527810, mailed Mar. 14, 2017, 4 pages.
Notice of Reasons for Rejection for Japanese Application No. 2015-505068, mailed Mar. 16, 2017, 10 pages.
Final Office Action for U.S. Appl. No. 13/731,028, mailed Apr. 13, 2017.

* cited by examiner

1

2

3

FALLBACK IDENTITY AUTHENTICATION TECHNIQUES

RELATED FIELD

The presently disclosed subject matter relates to the field of online identity authentication.

BACKGROUND

Private users, as well as public users, such as enterprises, benefit today from convenient and quick access to various electronic services provided by different types of service providers over communication networks such as the Internet.

To assure the security of these electronic services, an authentication process, dedicated to verifying the identity of remote users attempting to access a service provider server, often takes place. The authentication process enables to conduct risk assessment for determining the degree of risk that a user is attempting to fraudulently access the service, using false identity. Furthermore, risk assessment may also include an assessment of the potential harm which may be inflicted on the system, should an error in authentication of a user's identity occur.

One type of authentication technique involves, responsive to a request made by a user to access a service provider server, redirecting the authentication process from the service provider server back and through the user's computer to an authentication server in a manner which is transparent to the user (e.g. using dedicated data formats such as SAML, OAuth and OpenID).

Another type of authentication technique is Multi Factor Authentication (MFA). While using MFA, a user attempting to access a computer system, is authenticated, based on at least two different authentication factors selected from three different categories. The categories include: Something you know (for example, a password); Something you have (for example, an ID badge or a cryptographic key); and Something you are (for example, a voice print or other biometrics).

GENERAL DESCRIPTION

Using MFA helps to reduce the related risk factor involved in online access of users to service provider servers. One example of MFA is out-of-band authentication, where two separate network connections, working simultaneously, are used to authenticate a user. Out-of-band authentication is advantageous because even if a fraudulent user gains all security credentials of a user's account, authentication of the user cannot be completed without access to all authentication network connections.

In one example of out-of-band authentication, a user attempting to access a service provider server using a first user device (e.g. PC or laptop computer) over a first network connection is prompted to respond to a challenge which is transmitted to a second user device such as a cell phone (e.g. Smartphone) over a second network connection.

Optionally, the authentication process can be initiated over a different communication network connection to provide the network separation desired for enhancing security. According to this approach, before the challenge is transmitted to the second user device over a second communication network connection (between authentication server and second user device), the user device receives a notification over a third communication network connection.

It is noted that although the first device and second device are not necessarily different types of devices, for the sake of clarity and simplicity in the following discussion the first device is referred to herein as a "user device" (indicated as device 101 in FIG. 1) and the second device is referred to herein as a "mobile user device" (indicated as device 107 in FIG. 1). The user mobile device can be any type of electronic communication device which is capable of receiving a notification from a notification server, as explained below.

The challenge which is presented to the user on the user mobile device can be presented in various forms and include various types of instruction or request. For example, the challenge can include a onetime password (OTP) which the user is required to input to the user device and/or a knowledge based challenge, requesting the user to provide private information previously submitted by the user. A challenge may also include a request to perform an interacting operation on the user mobile device (e.g. press a button or slide a graphic slider presented by an application installed on the mobile user device). This type of user authentication enables to approve user access by allowing the user to perform a simple interaction with the user mobile device in a user friendly manner.

Despite its advantages, an out-of-band authentication process may be unsuccessful due to failure of the user mobile device to provide the required response to the challenge for reasons other than a fraudulent attempt to access a service. The inability to diagnose the true reason for failure to receive a response to a given challenge is disadvantages to the authentication process. Furthermore, in some cases, knowing the reason for failing to receive a response to a challenge can help to initiate an appropriate alternative authentication technique which, optionally, does not involve the mobile user device. Such alternative authentication techniques may include alternative out-of-band authentications which assist in maintaining a desired risk level.

Thus, according to one aspect of the presently disclosed subject matter there is provided a system for authorizing access of a user device to a service provider (SP) server, comprising: an authentication server computer device comprising at least one computer processor operatively connected to a computer memory and configured to:

communicate over a communication link with the SP server and, responsive to a request, to authenticate the identity of a user attempting to access the SP server via a user device (UD), initiate at least one authentication operation using a second UD;

in the event of a failure to receive a response to the at least one authentication operation from the second UD, the authentication server is configured to:

send instructions to the UD to make the second UD ready for communicating with the authentication server; and to initiate a second time the at least one other authentication operations via the second UD; and responsive to receiving information, indicating that the second UD is unavailable for communicating with the authentication server to:

cause said UD to display instructions related to an alternative authentication method which does not involve the second UD.

Additional to the above features, the system according to this aspect of the presently disclosed subject matter can optionally comprise one or more of features (i) to (xiii) below, mutatis mutandis, in any desired combination or permutation.

(i). wherein, in the event of a failure to receive a response to the at least one authentication operation from the second UD, the authentication server is configured to cause a query to be displayed on the UD; the query asking whether the second UD is available for communicating with the authentication server; and receive from UD the information indicating whether the second UD is available or not.

(ii). wherein the instructions to the UD, to make the second UD ready for communicating with the authentication server, are sent responsive to receiving information, indicating that the second UD is available for communicating with the authentication server;

(iii). wherein the at least one authentication operation is a notification request which is sent by the authentication server to a notification server; the notification server is configured, responsive to the notification request, to send a notification to the second UD, a notification for causing the second UD to be ready for receiving one or more challenges from the authentication server;

wherein the at least one other authentication operation sent by the authentication server, is a challenge sent directly by the authentication server to the second UD, to be completed at the second UD, in order to assist in authenticating the user.

(iv). wherein the authentication server is configured to: provide the UD with partial access to the SP server responsive to completion of the challenge; repeatedly initiate attempts to send the notification to the second UD; and provide the UD with full access once a response to the notification is received from the second UD.

(v). wherein the at least one other authentication operation is a challenge; the authentication server is configured in case of a failure to receive a response to the challenge, to send instructions to the UD, requesting to use an authentication method operated locally on the second UD.

(vi). wherein the authentication server is configured to send challenge related data to be displayed on the UD; wherein challenge related data is required in order to enable the authentication method to operate locally on the user mobile device.

(vii). wherein for using the alternative authentication, the authentication server is configured to: initiate one or more authentication operations using a colleague UD, wherein the one or more authentication operations include a challenge presented on the colleague UD to be completed by the user in order to be granted access to the SP server; determine an authorization-recommendation at least partly based on a response to the one or more authentication operations received from the colleague UD; and provide the authorization-recommendation to the SP server.

(viii). wherein the one or more authentication operations include instructions to input in the colleague UD login credentials of the user.

(ix). wherein the one or more authentication operations include instructions to input in the colleague UD login credentials of the user and login credentials of the colleague.

(x). wherein the authentication server is configured to send challenge related data to be displayed on the UD; wherein the challenge related data is required in order to complete the challenge.

(xi). wherein the challenge related data includes at least one QR code to be scanned by the colleague UD for obtaining respective data.

(xii). wherein the authentication server further comprises an image processing module; the authentication operation includes a challenge comprising instructions to capture at least one selfie of the user and/or the colleague; the image processing module is configured to compare the at least one selfie with one or more previously stored selfies and determine a degree of similarity between the selfie and the one or more previously stored selfies, and provide the authorization-recommendation based on the degree of similarity.

(xiii). wherein the instructions request that one or both of the colleague and user perform one or more of: gesture at least one specified gesture while capturing the at least one selfie; and display a certain object while capturing the at least one selfie.

(xiv). wherein the at least one authentication operations include a challenge presented on the colleague UD to be completed by the user in order to be granted access to the SP server, wherein the challenge includes instructions requesting the user to speak into a microphone of the colleague UD to enable to obtain a recorded speech; the authentication server further comprising a voice recognition processing module configured to determine a degree of similarity between the recorded speech and previously recorded speech, wherein an authorization-recommendation is provided based on the degree of similarity.

According to another aspect of the presently disclosed subject matter there is provided a computerized method of authorizing access of a user device to a service provider (SP) server, comprising: using at least one computerized device for: communicating over a communication link with the SP server and responsive to a request to authenticate the identity of a user, attempting to access the SP server via a user device (UD), initiating at least one authentication operation using a second UD;

in the event of a failure to receive a response to the at least one authentication operation from the second UD, performing at least the following operations:

responsive to receiving information indicating that the second UD is available for communicating with the computerized device: sending instructions to the UD to make the second UD ready for communicating with the computerized device;

initiating a second time the at least one other authentication operations via the second UD; and responsive to receiving information indicating that the second UD is unavailable for communicating with the computerized device: causing said UD to display instructions related to an alternative authentication method which does not involve the second UD.

According to another aspect of the presently disclosed subject matter there is provided a non-transitory program storage device readable by a computer, tangibly embodying a program of instructions executable by the computer to perform a method of method of authorizing access of a user device to a service provider (SP) server, comprising:

communicating over a communication link with the SP server and, responsive to a request to authenticate the identity of a user, attempting to access the SP server via a user device (UD), initiating at least one authentication operation using a second UD; in the event of a failure to receive a response to the at least one authentication operation from the second UD, performing at least the following operations:

responsive to receiving information indicating that the second UD is available for communicating with the computerized device: sending instructions to the UD to make the second UD ready for communicating with the computerized device;

initiating a second time the at least one other authentication operations via the second UD; and, responsive to receiving information, indicating that the second UD is unavailable for communicating with the computerized device: causing said UD to display instructions related to an alternative authentication method which does not involve the second UD.

According to another aspect of the presently disclosed subject matter there is provided an authentication server configured for authorizing access of a user device to a service provider (SP) server, the authentication server comprising at least one computer processor operatively connected to a computer memory and configured to:

communicate over a communication link with the SP server and, responsive to a request to authenticate the identity of a user, attempting to access the SP server via a user device (UD), initiate at least one authentication operation using a second UD;

in the event of a failure to receive a response to the at least one authentication operation from the second UD, the authentication server is configured to:

responsive to receiving information indicating that the second UD is available for communicating with the authentication server to:

send instructions to the UD to make the second UD ready for communicating with the authentication server; and to initiate a second time the at least one other authentication operations via the second UD; and responsive to receiving information indicating that the second UD is unavailable for communicating with the authentication server to:

cause said UD to display instructions related to an alternative authentication method which does not involve the second UD.

The method, the computer storage device and the server disclosed in accordance with the presently disclosed subject matter can optionally comprise one or more of features (i) to (xiii) listed above, mutatis mutandis, in any desired combination or permutation.

According to another aspect of the presently disclosed subject matter there is provided a colleague user device (UD), the colleague user device being for example a user mobile device such as a Smartphone, configured to communicate with a system for authorizing access of a user device to a service provider (SP) server; the system comprises an authentication server configured to communicate over a communication link with the SP server and, responsive to a request to authenticate the identity of a user, attempting to access the SP server via a user device (UD), enabling authentication of the user using the colleague UD;

the colleague UD is configured to receive instructions related to at least one authentication operation from the authentication server dedicated for authenticating the user; and to provide the authentication server with a response to the authentication operation, thereby enabling the authentication server to generate an authorization-recommendation with respect to the user.

The at least one authentication operation includes a challenge sent directly by the authentication server to the second UD, to be completed by the user in order to be granted access to the SP server, wherein the colleague user device is configured to complete the device using challenge related data provided by the authentication server via the user device.

According to another aspect of the presently disclosed subject matter there is provided a system for authorizing access of a user device to a service provider (SP) server, comprising an authentication server computer device comprising at least one computer processor operatively connected to a computer memory and configured to:

communicate over a communication link with the SP server and, responsive to a request to authenticate the identity of a user, attempting to access the SP server via a user device (UD); initiate one or more authentication operations using a colleague UD, wherein the one or more authentication operations include a challenge presented on the colleague UD to be completed by the user in order to be granted access to the SP server; determine an authorization-recommendation at least partly based on a response to the one or more authentication operations received from the colleague UD; and provide the authorization-recommendation to the SP server.

According to another aspect of the presently disclosed subject matter there is provided a computerized method of authorizing access of a user device to a service provider (SP) server, comprising:

using at least one computerized device for:

communicating over a communication link with the SP server and responsive to a request to authenticate the identity of a user attempting to access the SP server via a user device (UD);

initiating one or more authentication operations using a colleague UD, wherein the one or more authentication operations include a challenge presented on the colleague UD to be completed by the user in order to be granted access to the SP server;

determining an authorization-recommendation at least partly based on a response to the one or more authentication operations received from the colleague UD; and providing the authorization-recommendation to the SP server.

According to another aspect of the presently disclosed subject matter there is provided a non-transitory program storage device readable by a computer, tangibly embodying a program of instructions executable by the computer to perform a method of authorizing access of a user device to a service provider (SP) server, the method comprising:

using at least one computerized device for:

communicating over a communication link with the SP server, and, responsive to a request to authenticate the identity of a user, attempting to access the SP server via a user device (UD);

initiating one or more authentication operations using a colleague UD, wherein the one or more authentication operations include a challenge presented on the colleague UD to be completed by the user in order to be granted access to the SP server;

determining an authorization-recommendation at least partly based on a response to the one or more authentication operations received from the colleague UD; and providing the authorization-recommendation to the SP server.

BRIEF DESCRIPTION OF THE DRAWINGS

In order to understand the invention and to see how it may be carried out in practice, embodiments will now be described, by way of non-limiting example only, with reference to the accompanying drawings, in which.

Figure 1:
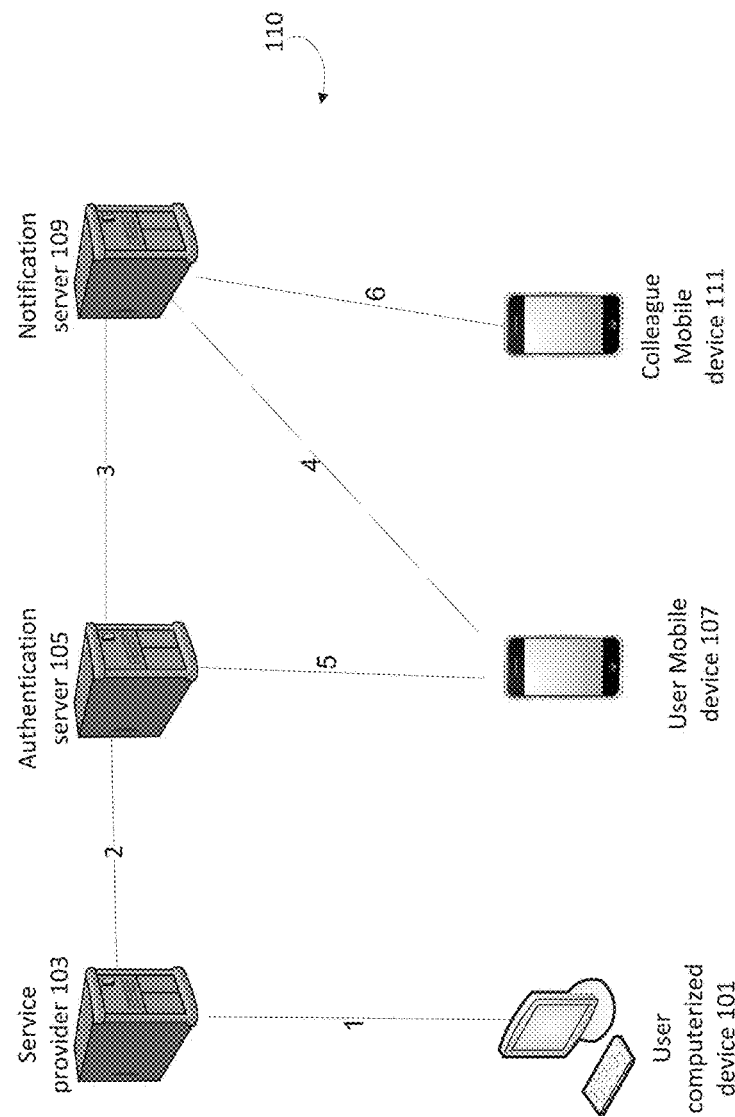
FIG. 1 is a high level functional block diagram schematically illustrating network connections, in accordance with an example of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that throughout the specification discussions applying terms such as "communicating", "querying", "causing", "determining" "initiating", or the like, include action and/or processes of a computer that manipulate and/or transform data into other data, said data represented as physical quantities, e.g. such as electronic quantities, and/or said data representing the physical objects.

The terms "computer", "processor", "computer processor", "computerized device" or the like should be expansively construed to cover any kind of electronic device with data processing capabilities including, by way of non-limiting example, a digital signal processor (DSP), a microcontroller, a field programmable gate array (FPGA), an application specific integrated circuit (ASIC), or any other electronic computing device comprising one or more processors of any kind, or any combination thereof.

Each one of the elements illustrated in FIG. 1 including servers 103, 105, and 109, user device 101, user mobile device 107 and colleague (mobile) device 111 represent a computerized device configured with one or more computer processors and a computer memory (including transitory computer memory and/or non-transitory computer memory) which are configured to perform various data processing operations. Examples of such devices include by way of example, a personal computer, portable computer, Smartphone, notepad, dedicated server computer device, any type of communication device, etc.

The operations in accordance with the teachings herein may be performed by a computer specially constructed for the desired purposes or by a general purpose computer specially configured for the desired purpose by a computer program stored in a non-transitory computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter, fewer, more and/or different stages than those shown in FIGS. 2 to 8 may be executed. In embodiments of the presently disclosed subject matter one or more stages illustrated in FIGS. 2 to 8. FIGS. 2 to 8 may be executed in a different order and/or one or more groups of stages may be executed simultaneously. FIGS. 1, 9a and 9b illustrate general functional schematics of the system architecture in accordance with an embodiment of the presently disclosed subject matter. Functional elements in FIGS. 1, 9a and 9b may be centralized in one location or dispersed over more than one location. In other embodiments of the presently disclosed subject matter, the system may comprise fewer, more, and/or different functional elements than those shown in FIGS. 1, 9a and 9b.

Bearing the above in mind, attention is now drawn to FIG. 1 which shows a high level functional block diagram schematically illustrating communication network connections according to an example of the presently disclosed subject matter.

The network architecture shown in FIG. 1 is a general example which demonstrates some principles of the presently disclosed subject matter. Network 110 can include one or more types of communication networks. For example communication networks can include any one of: the Internet, local area network (LAN), wide area network (WAN), metropolitan area network (MAN), various types of telephone networks (including for example PSTN with DSL technology) or mobile networks (including for example GSM, GPRS, CDMA etc.), or any combination thereof. Communication within the network can be realized through any suitable connection (including wired or wireless) and communication technology or standard (WiFi, 3G, LTE, etc).

In the illustrated example, communication network 110 comprises a user device 101 (i.e. a first client device), service provider (SP) server 103, authentication server (AS) 105, user mobile device 107 (i.e. a second client device), notification server (NS) 109, and colleague (mobile) device 111. The various computerized devices in network 110 are operable to communicate over the network communication links. Solid lines connecting different computerized devices illustrated in FIG. 1 indicate a communication link.

SP server 103 can be made accessible to user's devices 101 for providing the users with services. The types of the services which are provided can depend on the specific type of service provider and include for example, Application Service Provider (ASP), Storage Service Provider (SSP), Internet Service Provider (ISP) or Payment Service Provider (PSP). For instance, an Application Service Provider (ASP) is configured for providing computer-based services to customers over a network. A user, operating device 101 can initiate an attempt to access SP server 103 requesting to receive a respective service. The user can use a computer program installed on device 101 (e.g. network browser, web browser or some other specifically dedicated software) for communicating and attempting to access the SP server 103.

SP server 103 is configured, responsive to an access (access-request) received from computerized user device 101, to initiate an authentication process. As mentioned above, an authentication process is executed in order to verify the identity of a user attempting to access SP server 103 and thus avoid unauthorized and/or malicious access to the server. The authentication process can be initiated by sending an authentication request to authentication server 105 requesting to verify the identity of the user. Authentication server 105 is connected to SP server 103 over communication link 2 and is configured to execute the authentication process.

Figure 2:
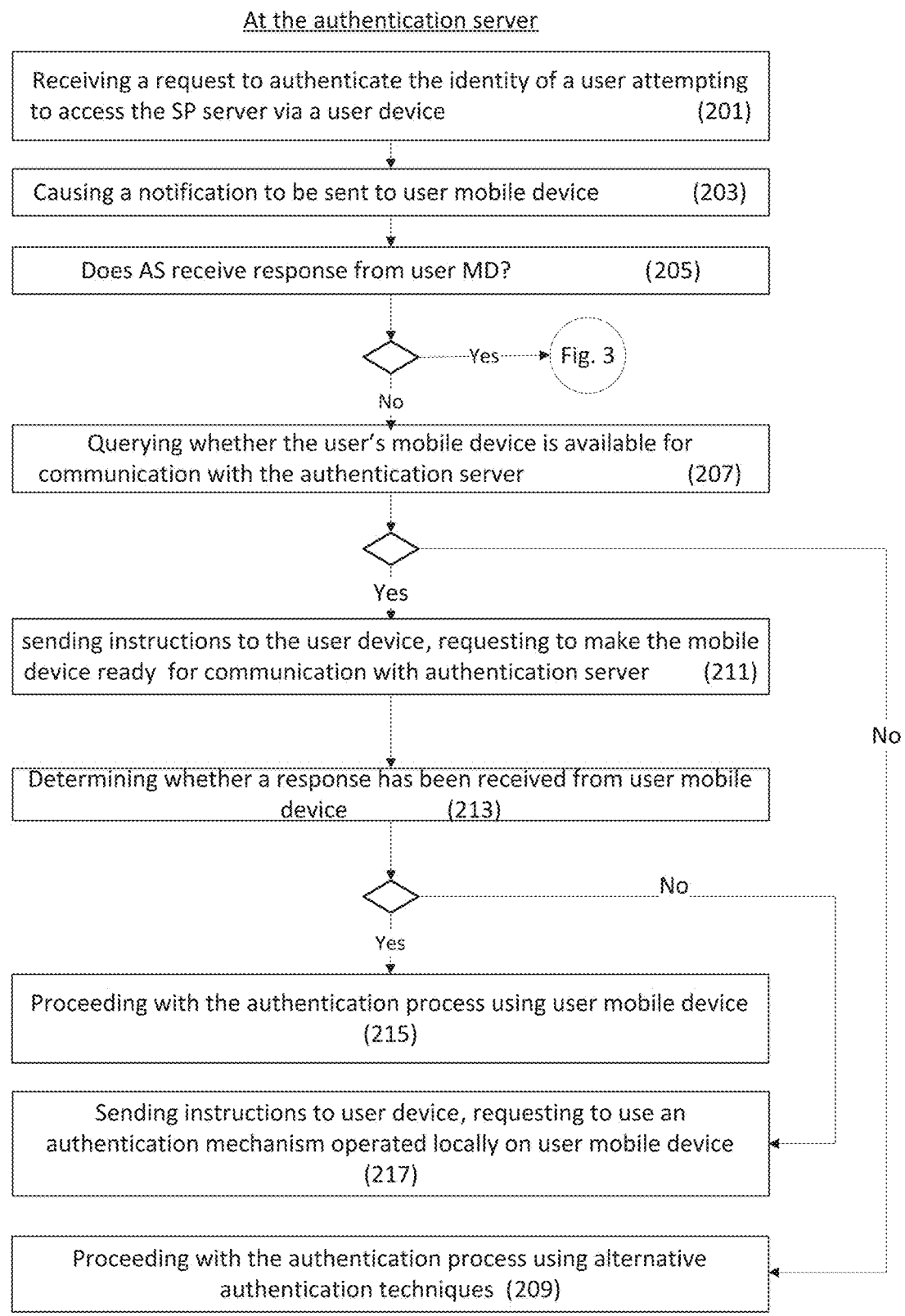
FIG. 2 is a flowchart showing operations which are carried out, in accordance with an example of the presently disclosed subject matter.

FIG. 2 is a flowchart exemplifying operations which are carried out according to examples of the presently disclosed subject matter. For the sake of clarity and by way of example, operations in FIG. 2 are described herein with reference to functional elements illustrated in FIG. 1. Operations described with reference to FIG. 2 include computer operations executed by a computerized device (e.g. AS 105).

At block 201 a request to authenticate the identity of a user attempting to access SP server 103 is received at authentication server 105. The request may be in any appropriate format and may include any appropriate content. For example, a request sent to authentication server 105 can include user identification data. Additionally, an authentication request may also include data such as the location(s) of user device 101, session identifier(s), identifier(s) of the service provider, etc.

According to an example of the presently disclosed subject matter, the authentication process starts as a multi factor authentication process. To this end, user mobile device 107 is used for communicating with the authentication server over a separate network connection (providing a "what you have" authentication factor). Accordingly, the authentication becomes a two factor out-of-band authentication mechanism.

Furthermore, this authentication mechanism requires communication over at least 5 different communication links. One connecting computerized user device 101 to server 103 (1), a second connecting server 103 with server 105 (2), a third connecting user mobile device 107 with sever 105 (5) and a fourth connection connecting server 105 with server 109 (3) which is configured in turn to connect to mobile device 107 (4). The increased number of communication links increases the security of the authentication process.

According to one example, during authentication of a user attempting to access server 103 (e.g. attempting to perform a sensitive transaction or a login operation) AS 105 initiates one or more authentication operations directed for authenticating the user's identity. The term "authentication operation" used herein pertains to operations executed as part of the authentication of a user attempting to access SP server 103. Authentication operation can be initiated by AS 105 for the purpose of authenticating the user. Authentication operations include for example initiating communication with a mobile device via a notification server (e.g. by sending a notification request to NS 109), and initiating a challenge presented to the user on user device 101 or mobile device 107.

Notably, these two types of authentication operations differ in both the type of data which is being transmitted, as well as the transmission path. As explained below, an authentication operation involving the transmission of a notification request can be sent only via NS 109, and is limited in the type and size of the data that can be transmitted to user mobile device 107. On the other hand, an authentication operation related to the transmission of a challenge can be transmitted by authentication server to any one of user device 101, device 107, and colleague device 111 and can comprise various types of data in various sizes (depending, inter alia, on the specific challenge).

For example, AS 105 may initiate at least one challenge (the challenge being one type of an authentication operation) which is received and/or initiated at the user's mobile device 107. The user is prompted to respond to the challenge and provide AS 105 with the response. According to the user's response, AS 105 can provide a recommendation to SP server as to whether to approve or deny the requested access.

As part of causing at least one challenge to be received at the user's mobile device 107, AS 105 is configured to send a notification request (the notification request being another type of an authentication operation) to notification server 109 (block 203) which is configured in turn to send a notification to mobile device 107.

NS 109 is a dedicated server capable of initiating a communication session with user mobile device 107 over an appropriate network and sending the notification. In practice, user mobile device 107 can be equipped with a Ping software utility which is configured to repeatedly send Ping messages (e.g. Internet Control Message Protocol (ICMP) packets) to NS 109. NS 109 can be configured to respond to these messages and send notification packages (aka tokens) back to user mobile device 107.

Responsive to the notification received at user mobile device 107, mobile device 107 is configured to follow the instructions provided within the notification packages and send to AS 105 a message comprising data which may include the token as well as some additional information gathered from the mobile device. This message indicates to AS 105 that mobile device 107 is ready for receiving a challenge. The notification, received from NS 109, can also cause the activation of an appropriate application installed on mobile device 107 (e.g. user authentication module 931 illustrated in FIG. 9b below) rendering the device ready for receiving the challenge from AS 105. In response to the message received from mobile device 107, AS 105 can send the challenge to mobile device 107. The challenge is received at mobile device 107 (e.g. with the help of the relevant application) and displayed on the device screen.

As mentioned above, successful usage of NS 109 involves communication over 5 different communication links, thus providing an increased level of security of the authentication process.

Following the transmission of the notification request to NS 109, AS 105 awaits a response from mobile device 107 for a certain period of time (timeout period). AS 105 determines whether a response to the notification is received from mobile device 107 (block 205).

Figure 3:
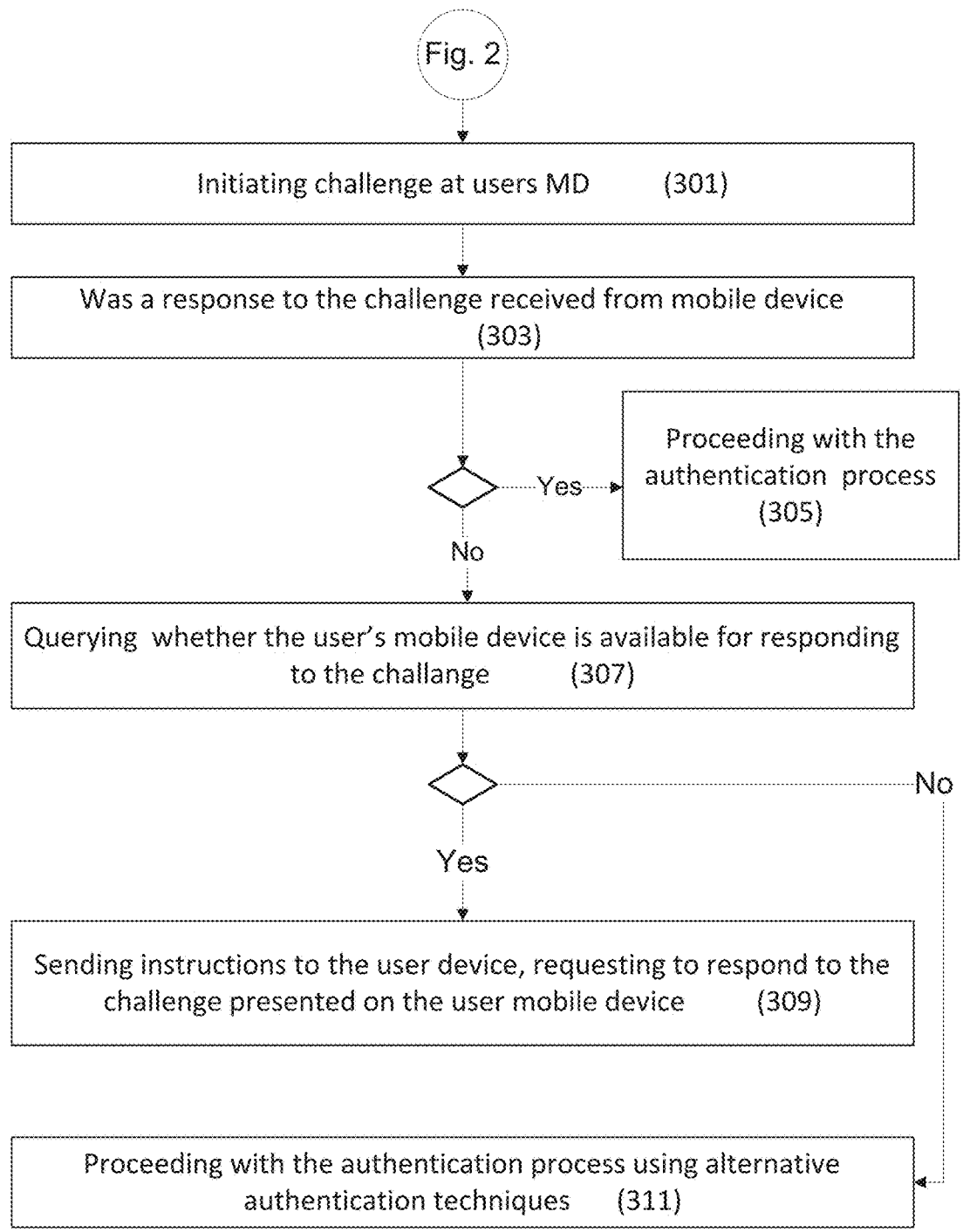
FIG. 3 is a flowchart showing operations which are carried out, in accordance with an example of the presently disclosed subject matter.

If a response to the notification is received from mobile device 107, AS 105 is configured to proceed, as described in more detail with reference to FIG. 3. Following below there is provided a description of the operations carried out according to the examples illustrated in FIG. 3. The specification reverts to FIG. 2 shortly after.

As mentioned above, after receiving a response to the notification from user device 107, AS 105 is configured to send a challenge back to user device 107 (block 301). At block 303 in FIG. 3, AS 105 determines whether a user initiated response to the challenge is received from mobile device 107.

If a response to the challenge is received, the authentication and authorization process can be completed (block 305). In this case, AS 105 can determine whether or not the identity of the user is authenticated and, accordingly, whether or not to authorize the user access to SP server 103. As described below with reference to FIG. 2, AS 105 may provide an "authorization-recommendation" comprising information indicative of a level of risk involved in authorizing access of a user to SP server 101.

Authentication of the user's identity can be accomplished for example, based on information obtained from mobile device 107 gathered as part of the challenge. Alternatively or additionally, authentication of the user's identity can be accomplished based on the historical information stored in AS 105 data-repository (910 in FIG. 9a below). Historical information can include for example, recently approved attempts of the same user to access an SP server.

Otherwise, if a user response to the challenge is not received, AS 105 attempts to determine the reason for the lack of response. Successful reception of communication with the AS 105 application in response to the notification and failure to receive a response to the challenge can be caused, for example, in case mobile device 107 is operating but is not available for use to the user. This can occur for example in the event that the user mobile device is out of user's reach (e.g. user is at work and has left his Smartphone at home), or in the event that the mobile device is within the user's reach, but the user is unaware of the received challenge.

Thus, in some cases the user can remedy the problem causing the failure of the user to respond to the challenge, while in other cases this is not possible. According to an example of the presently disclosed subject matter, AS 105 is configured to alert the user and request the user to fix the problem and respond to the challenge if possible. If this is not possible, the AS 105 can proceed with the authentication according to an alternative authentication technique which does not involve mobile device 107.

At block 307, AS 105 sends a query to user device 101 asking the user to indicate whether mobile device 107 is available or not for responding to the challenge. Instructions can be displayed on the display of user device 101 prompting the user to respond to the presented question or questions regarding the availability of device 107. The query can be presented on user device 101 in any way known in the art. For example, a message can be transmitted and displayed on user device 101 (e.g. in a graphical user interface) requesting the user to indicate the availability of the mobile device. The message can include for example, a multiple choice question (using for example radio buttons graphical display) querying as to whether or not mobile device 107 is available for communication with AS 105.

If the user response inputted to user device 101 is that mobile device 107 is available for responding to the challenge, AS 105 can send a request to the user device 101 asking the user to respond to the challenge sent to mobile device 107 (block 309). The request can be presented on the user device in any way known in the art. After a response to the challenge is received at AS 105, AS 105 can be configured to provide to SP 103 an authorization-recommendation, based on the response to the challenge provided from UD 107.

If the user response on user device 101 is that mobile device 107 is not available for responding to the challenge, AS 105 can continue the authentication using alternative techniques which do not involve mobile device 107 (block 311).

In some examples, the two operations according to blocks 307 and 309, can be consolidated as a single step where AS 105 sends instructions to the user to respond to the challenge sent to mobile device 107, or to otherwise indicate if the mobile device is not available. Optionally, along with the operations in blocks 307 and 309, AS 105 can also re-send the challenge to user mobile device 107.

Attention is now drawn back to FIG. 2 block 205. Optionally, if a response is not received from mobile device 107, AS 105 can initiate one or more additional attempts to send a notification to mobile device 107. In these attempts more requests are sent to NS 109 instructing to send notifications to user mobile device 107.

If all attempts fail, a fallback process can be executed by AS 105 directed for investigating the reasons for failing to receive a response from mobile device 107 and determining an appropriate course of action according to the result of the investigation. At this point it is desired to determine whether the user is capable of rectifying any existing problem and making the mobile device available for responding to the notification as well as the challenge.

Examples of reasons for failing to receive a response to the notification from the client include: the mobile device is at the user's disposal but it is turned off or is currently on flight mode blocking all types of communication; although user mobile device 107 is operating properly, it failed to receive the message sent by AS 105 or AS 105 failed to receive the response sent by mobile device 107 (e.g. due to some communication failure between user mobile device 107 and AS server 105, or to some operational failure of the authentication application installed on the user mobile device). In some cases, the user can fix these problems and make the mobile device available for participating in the authentication process.

If, however, the cause for failing to receive the challenge cannot be fixed by the user, mobile device 107 cannot participate in the authentication process and alternative authentication methods are required. For example, this may be the case if the mobile device is inoperable or out of batteries (with no immediate possibility of recharging) or the authentication application consistently fails to communicate with AS 105.

In order to determine the reason for failing to receive a response from mobile device 107 to an issued notification, AS 105 is configured to send a query to computerized device 101, asking whether mobile device 107 is available for communication with AS 105 (block 207). A message can be transmitted and displayed at computerized device 101 in a similar manner to that described above with reference to block 307.

If the user's response indicates that mobile device 107 is not available, AS 105 proceeds the authentication process using one or more alternative authentication techniques which do not involve the use of mobile device 107 (block 209). Examples of alternative authentication techniques are described below with reference to FIGS. 4-5.

If the user's response indicates that mobile device 107 is available, AS 105 is configured to send instructions to user device 101 asking the user to make the mobile phone ready for communication with AS 105 (block 211).

The user can perform the required operations for making the mobile device ready as requested. For example, depending on the specific problem, the user can do one or more of the following: turn on the mobile device, turn off flight mode, turn on or install the authentication applications, restart the mobile device, etc.

In some examples, the operations of block 207 and block 211 can be consolidated as a single step where AS 105 is configured to send instructions to the user to make the mobile device ready for communication with the authentication server (e.g. initiating authentication application), using mobile device 107, or otherwise to indicate if the mobile device is not available.

Notably, some of the problems discussed above can be automatically identified by AS 105. For example, AS 105 can be configured to identify that the authentication application is not installed on the mobile device or to identify operational failure of the authentication application installed on mobile device 107. In such cases AS 105 can be configured to send to device 101 information describing the estimated problem and possible solutions for the problem.

Following transmission of the instructions to user device 101, AS 105 can be configured to wait for a certain period of time (timeout period) allowing the user to make mobile device 107 available for communication with AS 105. Once the timeout period lapses, AS 105 can be configured to make another attempt to send the challenge to mobile device 107.

As communication link between mobile device 107 (as well as the authentication application installed thereon) and AS 105 is presumed to have been created, AS 105 can attempt to directly contact mobile device 107 and send a message requesting the user to respond to a challenge (optionally along with the challenge itself). At block 213 it is determined whether or not a response to the challenge has been received from mobile device 107.

According to one example, if a response is not received from mobile device 107, AS 105 can send instructions to user device 101, requesting to use some type of authentication mechanism operated locally on mobile device 107 (block 217). For example, an OTP generator installed on the mobile device can be activated for generating an OTP. The generated OTP is then entered to user device 101. AS 105 is configured to complete the authentication process based on the OTP received from user device 101.

The OTP generation can be a secured process, where it is generated based on challenge related data provided by AS 105 on device 101. For example, a QR code can be displayed on user device 101 and is scanned by mobile device 107. The QR coded can be generated for example by AS 105 according to instructions provided by the respective SP server which the user is attempting to access. The OTP generator in mobile device 107 is configured to generate the OTP based on the scanned QR code to increase security as well as to create variations in different access attempts made to different SP servers (where different SP servers use a different QR code). The OTP is then inputted by the user to device 101 and transmitted to AS 105.

According to another example, if a response is not received from mobile device 107, AS 105 can be configured to proceed to authenticate the user using alternative techniques, which do not involve mobile device 107, as explained in more detail with reference to FIGS. 4-5.

Otherwise, if a response is received from mobile device 107, AS 105 can be configured to initiate another attempt to complete the authentication process with the aid of mobile device 107 (block 215) as described above (for example with reference to block 309).

Notably, authentication of a user initiated by direct communication between AS 105 and mobile device 107 with no intervention of NS 109 reduces the number of out-of-band connections and consequentially reduces the level of security of the authentication process. Thus, in some examples, AS 105 is configured to send a notification request to notification server 109 which is configured in turn to send notification to mobile device 107. The notification can be a silent notification transmitted in the background, in a manner transparent to the user. Responsive to the notification, mobile device 107 can be configured to establish communication with the AS 105.

Optionally, in addition to directly contacting mobile device 107 and proceeding with the authentication process, AS 105 can make attempts (e.g. executed as background operations) to send a notification request to NS 109 which is configured, in turn, to send a notification to mobile device 107. According to this approach, the authentication process may be characterized by more than one level of authentication. For example, a user authenticated via direct communication with AS 105 is granted partial access to the SP server and is thus authorized to perform only part of the available operations. Only after a message is received at AS 105 from mobile device 107 indicating that the device has received the notification from NS 109, the user is granted full access to the SP server and is authorized to perform additional operations involving greater security risks (e.g. money transfer in a banking server).

At the end of the authentication process AS 105 can provide SP server 101 with an authorization-recommendation comprising information indicative of a level of risk involving authorizing access of a user to SP server 101. According to one example, AS 105 can provide SP server 101 with an authorization-recommendation comprising a grade (e.g. on a scale from 1 to 5 where 1 is completely safe and 5 is extremely risky) indicating the estimated risk level involved in permitting access of a user. Given the estimated risk, SP server 101 can determine whether or not to allow access of the user. The authorization-recommendation can be provided based on predefined preferences of SP server 101.

According to another example, AS 105 can provide SP server 103 with an authorization-recommendation comprising a final recommendation as to whether or not to permit access of a user. Optionally, the final authorization-recommendation can be based on predefined settings of a specific SP server. For example, if, according to the SP server, settings users can be granted with access only if the determined risk level is less than 3 (e.g. in a 1 to 5 risk scale), AS 105 can provide SP server 101 with a final authorization-recommendation depending on whether or not the risk level is less than 3.

Figure 4:
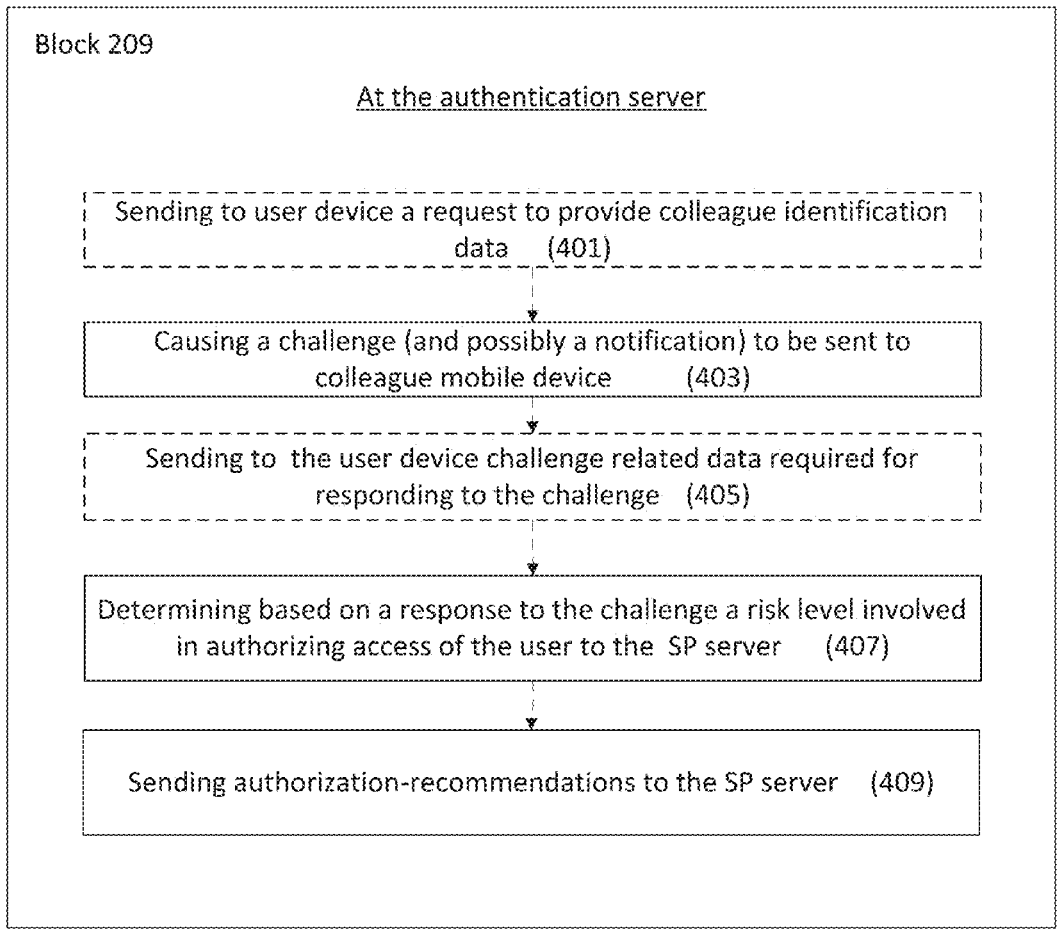
FIG. 4 is a flowchart showing operations which are carried out in an alternative authentication process, in accordance with an example of the presently disclosed subject matter.

Turning now to FIG. 4, it shows operations carried out in an alternative authentication technique using a colleague device, according to an example of the presently disclosed subject matter. In the event that the mobile device of the user attempting to access SP server 103 is not available for use in the authentication process, it is still desirable to use out-of-band authentication. To this end it is suggested herein to use a colleague's mobile device in the authentication process.

For example, if an employee of a certain firm is required to use his Smartphone in order to access the firm's computer system (or a specific restricted area within the firm's computer system) and he does not have his Smartphone, according to this approach the employee can use a colleague's Smartphone in order to access the system. This solution can be relevant both when the user is in the office, and when the user is out of office.

Consider for example, two colleagues from the same firm who are travelling together on a business trip. Both employees have each a laptop computer and a Smartphone. According to the firm's policy, the Smartphone is needed in order to access the firm's computer systems in an out-of-band authentication process. Assuming that the Smartphone of one employee has been lost, he can use his colleague's Smartphone for completing the authentication process in order to be granted access to the computer system through his laptop.

According to the illustrated example, responsive to receiving data indicating that mobile device 107 is not available, AS 105 is configured to send to user device 101 a request to send back to AS 105, data identifying a colleague intended to assist in the authentication process. The received data enables to communicate with the colleague's mobile device 111 (block 401). This data can include for example, a colleague's email address and/or telephone number, or any other data which would enable AS 105 to identify and communicate with the colleague's mobile device.

In other examples authentication server 105 may be configured to select the colleague. In such cases, AS 105 can send to user device 101 information identifying one or more colleagues who can be used in the process, inviting the user to approve/select a colleague.

Alternatively, a colleague's mobile device can be configured to initiate communication with AS 105. To this end, colleague mobile device 111 can comprise an authentication application operable in a special "help a friend" mode. This operation mode enables the device to initiate communication directly with AS 105 in case user mobile device 107 is not available. Responsive to the request (comprising colleague identification data) made by colleague device 111 AS can send the challenge to colleague device.

After the colleague identification data is received, AS 105 can initiate the transmission of a notification (via NS 109) and a challenge to the now identified colleague mobile device (block 403). As discussed above with reference to block 215 in FIG. 2, depending on the desired level of security, in some cases authentication (in this case of the colleague mobile device) can be based on direct communication between AS 105 and colleague mobile device, while in other cases it can also involve initiating a notification via NS 109.

The challenge can include an identity check directed for identifying the user and possibly also the colleague. According to one example, the user is requested to input his (and possibly also the colleague's) login credential (e.g. password and login name) to the colleague mobile device in order to reduce the risk of fraudulent access to the user's account using the colleague's device (e.g. by the colleague).

In some examples AS 105 can be configured to cause one or more additional challenges to be presented on the colleague device. For example, the challenge can further include a one-time password (OTP) provided on the colleague mobile device 111 where the user is required to input the OTP in user device 101 to gain access to SP server 103.

Optionally, as mentioned earlier, in order to further reduce the possibility of fraudulent access attempt to the user's account through the colleague's device and ensure that the colleague mobile device is located in the vicinity of user device 101, the issued challenge can require the colleague mobile device 111 to interact with user device 101. Accordingly, AS 105 can be configured to send to user device 101 challenge related data which is required for responding to the challenge (block 405). For example, AS 105 can be configured to send to user device 101 challenge related data such as a QR code. The challenge sent to colleague device 111 requires that the QR code, which is displayed on user device 101, is scanned and the obtained value (OTP) is sent back to AS 105 using user device 101.

Another example of a challenge which involves taking a picture of the user and\or the colleague is described below with reference to FIG. 7a and FIG. 7a.

Once a response to the challenge sent by colleague device 111 is received at AS 105, AS 105 is configured to determine, based on the response, the estimated risk level involved in the authorizing access of the user device to SP server 103 (block 407). AS 105 can then provide an authorization-recommendation to SP server 103 indicative as to whether or not to authorize access of the user to the SP server 103 (block 409).

Figure 5:
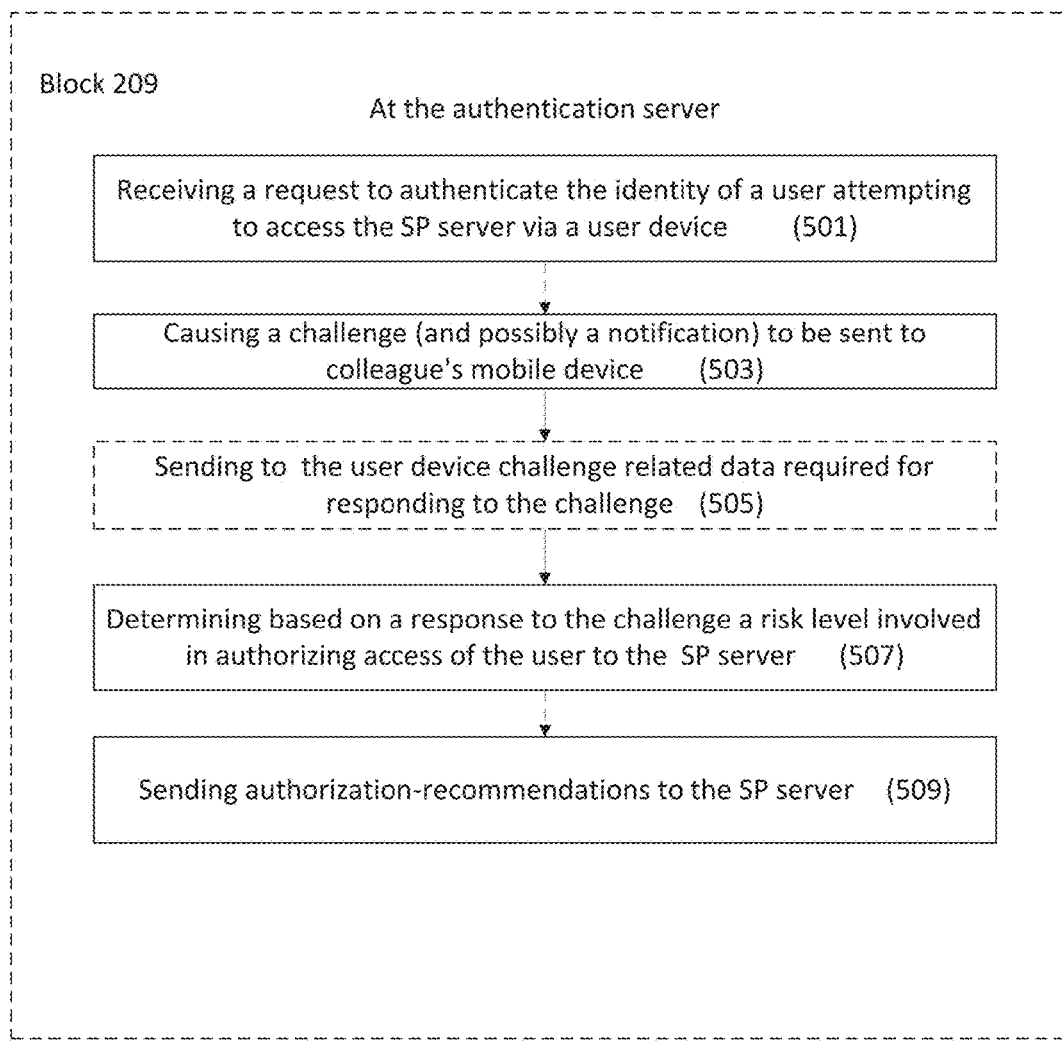
FIG. 5 is a flowchart showing operations which are carried out in an alternative authentication process, in accordance with an example of the presently disclosed subject matter.

FIG. 5 is another flowchart of operations carried out in an alternative authentication technique using a colleague device, according to an example of the presently disclosed subject matter. According to the example described above with reference to FIG. 4 colleague mobile device is used as an alternative (fallback) authentication technique when the user's mobile device is not available. FIG. 5 provides an example where colleague mobile device is used for authentication of a user as a default authentication mechanism, and not as fallback. Unlike the process described above with reference to FIGS. 2-4, here the colleague mobile device authentication option is used immediately after an authentication request is received from SP server 103.

For example, using a colleague's mobile device for authentication of a user may be required in certain predefined events. For instance, it can be required in the authentication of specific users only (e.g. can be used for granting access to users having an insufficient clearance for accessing a certain system without supervision) or it can be required only when the user is attempting to perform certain high risk operations (e.g. money transfer, data copying, etc).

AS 105 can be pre-configured with a list of verified colleagues which are allowed to be used during authentication. Data identifying each one of the colleagues appearing on the list can be made available to AS 105 during a pre-configuration process occurring before the authentication. During actual authentication AS 105 can use one of the colleagues which appear on the list for authenticating the user. Optionally, the user can be allowed to select one of the colleagues from the list to assist in the authentication. For example, the user can select a colleague of his choice who is near and available.

At block 501, AS 105 receives a request from SP server 103 to authenticate a user attempting to access SP server 103 via user device 101. Optionally, the request may include colleague identification data received from user device 101.

AS 105 can then initiate the transmission of a notification (via NS 109) and a challenge to the now identified colleague mobile device (block 503). Operations in blocks 505 to 509 are similar to those described above with reference to blocks 405 to 409 and therefore are described herein in detail.

Figure 6:
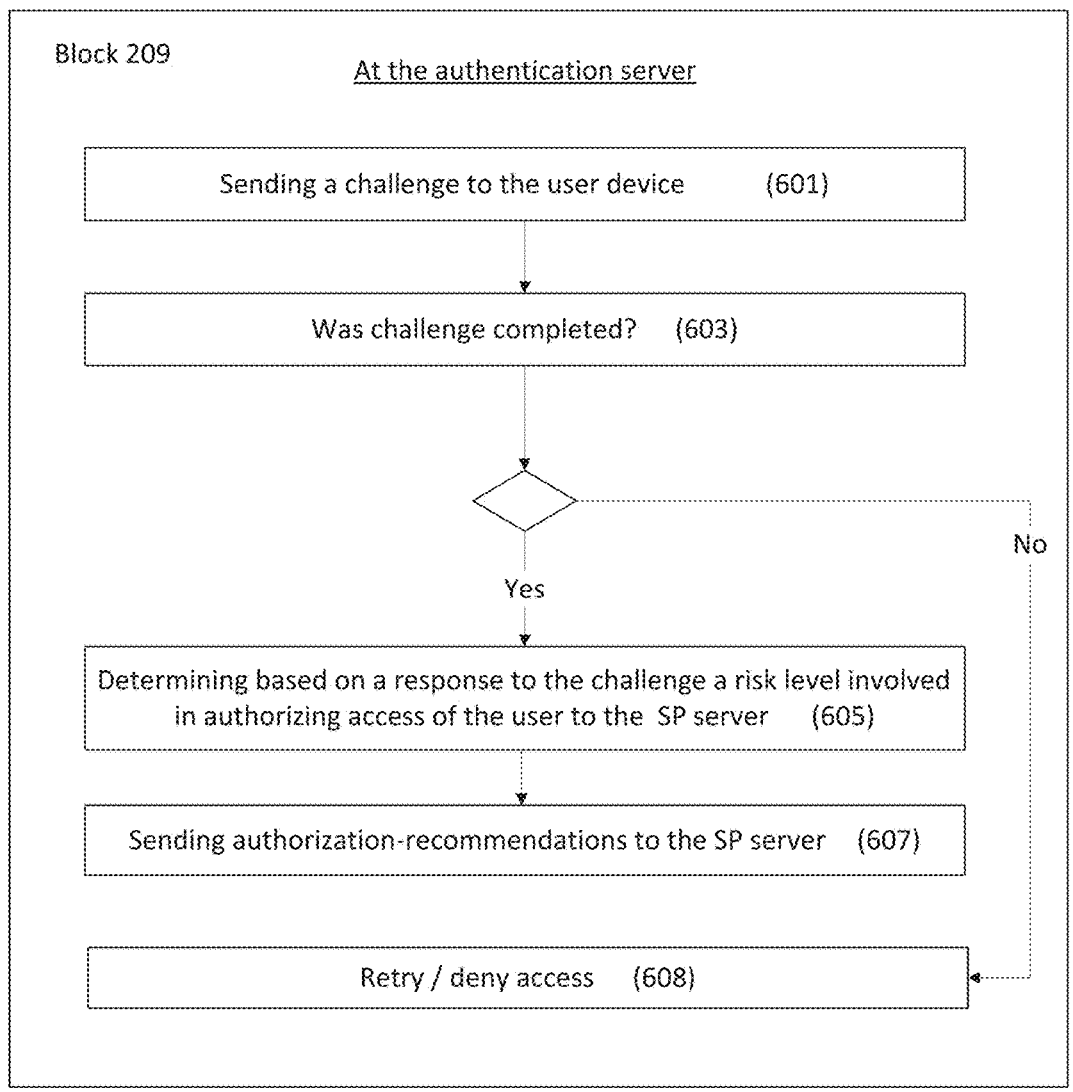
FIG. 6 is a flowchart showing operations which are carried out in an alternative authentication process, in accordance with an example of the presently disclosed subject matter.

FIG. 6 is a flowchart of operations carried out in an alternative authentication technique using user device, according to an example of the presently disclosed subject matter. According to this example, if mobile device 107 is not available for the authentication process, alternative authentication methods which are based on user device 101 are used.

At block 601, in the event that mobile device 107 is not available for participating in the authentication process, AS 105 can be configured to send a challenge to user device 101. The challenge is presented to the user via user device 101 and the user is requested to follow the instructions associated with the challenge in order to complete the authentication.

For example, the challenge can include a knowledge based test using "shared secrets" previously provided by the user e.g. during a preliminary sign-in process. In another example, the challenge can include a smart voice recognition test (speaker recognition) where the user is recorded while speaking to a microphone reciting certain words. The recorded speech is compared to the previously recorded voice of the user.

According to an example, in order to increase security, the user is recorded while reciting multiple words during a pre-configuration stage. During the authentication process, the user is requested to recite words which are different than those which were recorded in the pre-configuration stage. A computer processor is configured to synthesize a copy of the recited words based on the previously recorded words. The synthesized copy is then compared to the words which were recited during the authentication process and authentication of the user is based on the result of this comparison.

Based on the user response to the challenge, AS 105 provides SP server 103 risk assessment for determining whether or not to authorize access of the user (block 607). AS 105 can then provide an authorization-recommendation to SP server 103 indicative as to whether or not to authorize access of the user to the SP server 103 (block 609). Optionally, if the user is unsuccessful in completing the challenge, AS 105 can allow the user one or more additional attempts to complete the challenge before denying access to SP server 103.

Figure 7A:
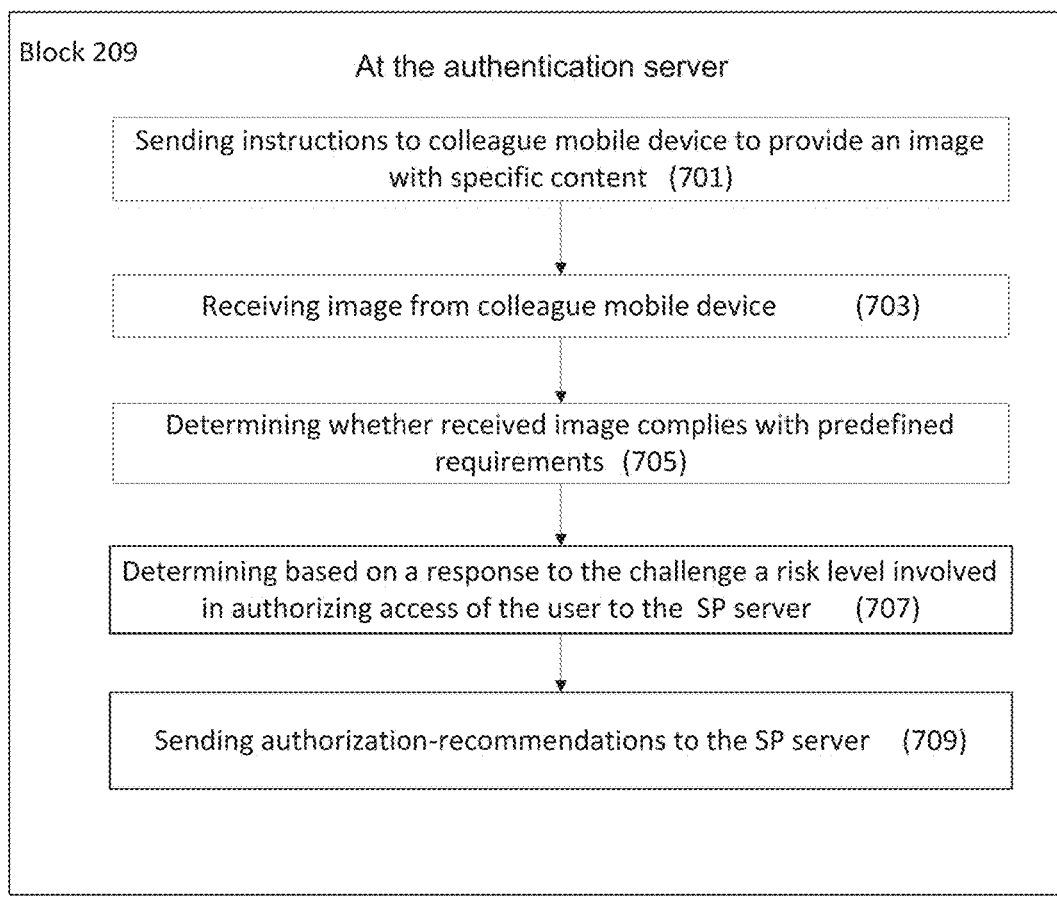
FIG. 7a is a flowchart showing operations which are carried out in an alternative authentication process, in accordance with an example of the presently disclosed subject matter.

FIG. 7a is a flowchart showing an alternative authentication method using a colleague mobile device and a camera, according to examples of the presently disclosed subject matter. According to this example, a challenge sent by AS 105 to colleague mobile device 111 includes instructions to provide (via colleague mobile device 111) to AS 105 a picture with specified content (block 701 corresponding to block 403 in FIG. 4). The instructions to provide the image, via device 111, may alternatively be provided via user device 101.

Figure 7B:
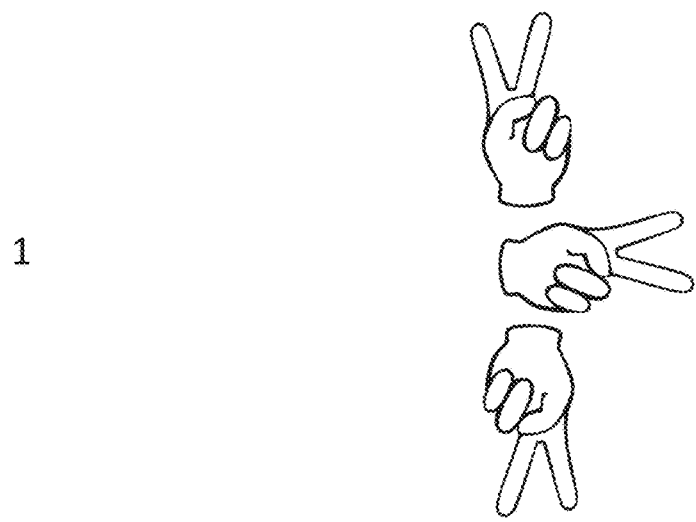
FIG. 7b is a schematic illustration of possible gestures which can be used, in accordance with an example of the presently disclosed subject matter.
Figure 7B:
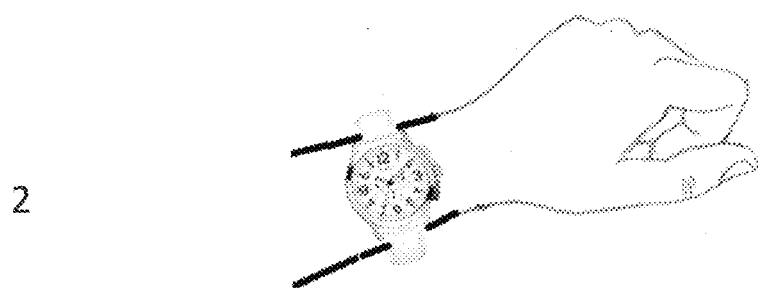
Figure 7B:
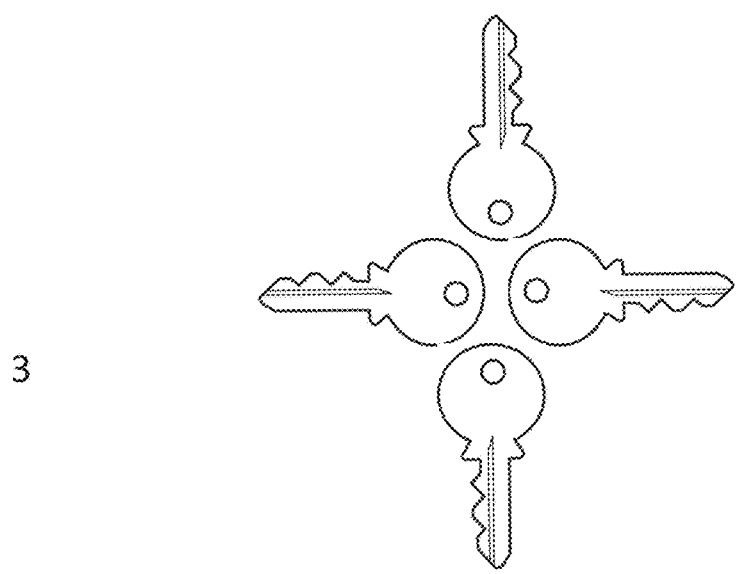

The instructions may require, for example, that either one of or both the user and his colleague are present in the picture (i.e. selfie—a self portrait photograph of the user and/or the colleague). The instructions may also require that the user and/or the colleague perform some type of gesture (e.g. thumbs up or victory gesture) while the picture is being taken. Examples of different types of gestures or other proofs are illustrated in FIG. 7b. According to example 1, the user may be required to take one or more selfies each showing his face along with a victory gesture in a predefined orientation with respect to the face. According to example 2, the user may be required to take one or more selfies each showing his face along with his wrist watch showing the current time. To increase security, the required orientation of the arm with respect to the face may change from time to time. According to example 3, the user may be required to take one or more selfies each showing his face along with another object such as a key, the object being held in a specific orientation with respect to his face.

This type of challenge can help to verify that that both the user and colleague are indeed present and thus can help to reduce unauthorized attempts of the user or the colleague to access SP server 103. Adding the gesture to the image reduces the risk that an image which is sent to AS 105 was actually captured at some other time. The captured image is sent back from colleague mobile device 111 to AS 105. The image can be taken by a camera integrated within the colleague's mobile device 111.

Notably, operations described with reference to block 701 can follow the receiving of identification data from device 111 as described earlier with reference to block 401.

At block 705, AS 105 is configured to execute image processing and compare the image to one or more previously stored images of the user and the colleague. To this end, AS 105 can be operatively connected to an image data-repository (910 in FIG. 9a) and an image processing module configured to implement an image processing algorithm for comparing the image received from the colleague device with images stored in the image data-repository and determine a degree of similarity between the received image and pre-stored images.

Based on the comparison results, AS 105 can provide SP server 103 with risk assessment of allowing the user to access SP server 103 (block 707 corresponding to block 407 in FIG. 4). For example, if the result of the comparison between the captured and pre-stored images complies with some predefined similarity threshold, AS 105 can provide SP server 103 with a positive recommendation to allow access to the user. Optionally, if the comparison shows poor results, the user can be given one or more additional attempts to provide the requested image.

Figure 8:
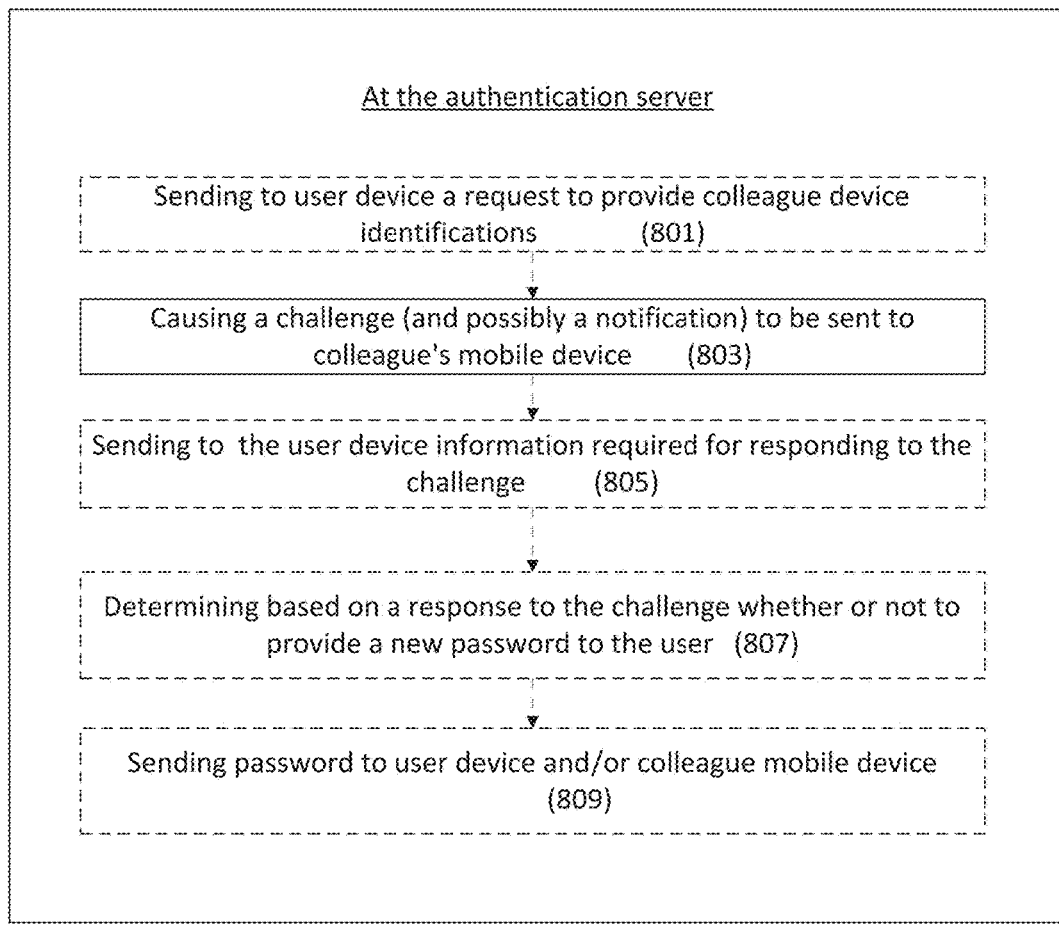
FIG. 8 is a flowchart showing operations which are carried out in a password reset process, in accordance with an example of the presently disclosed subject matter.
Figure 9A:
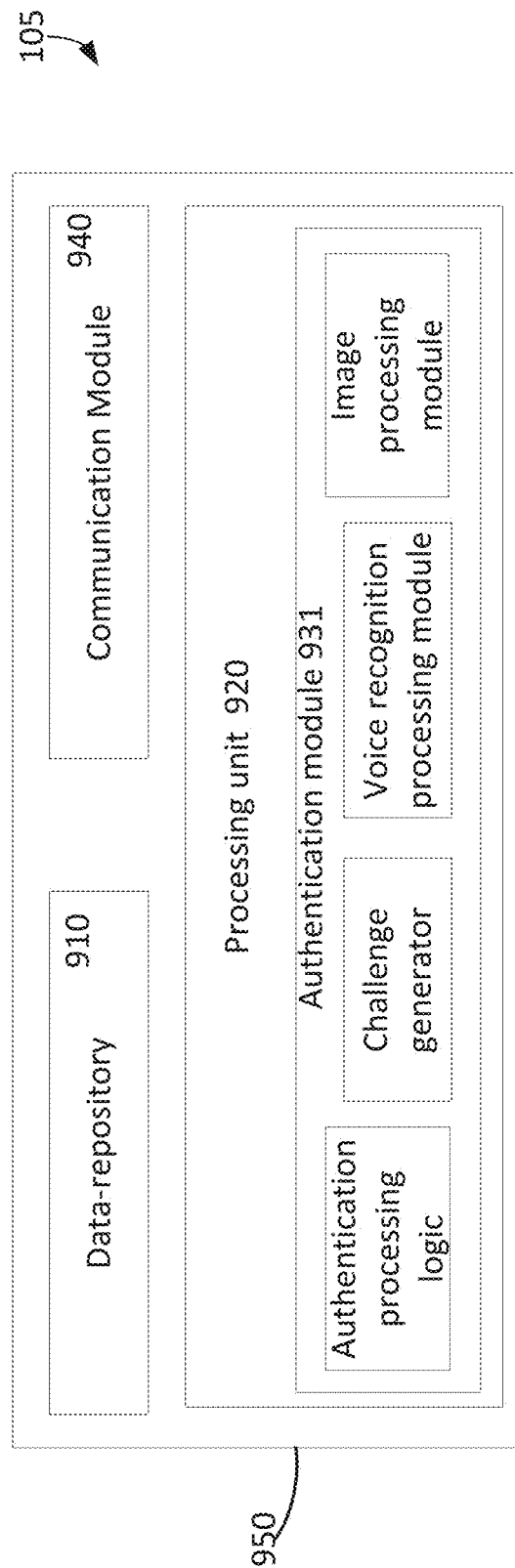
FIG. 9a is a functional block diagram showing an example of a user device, in accordance with an example of the presently disclosed subject matter.
Figure 9B:
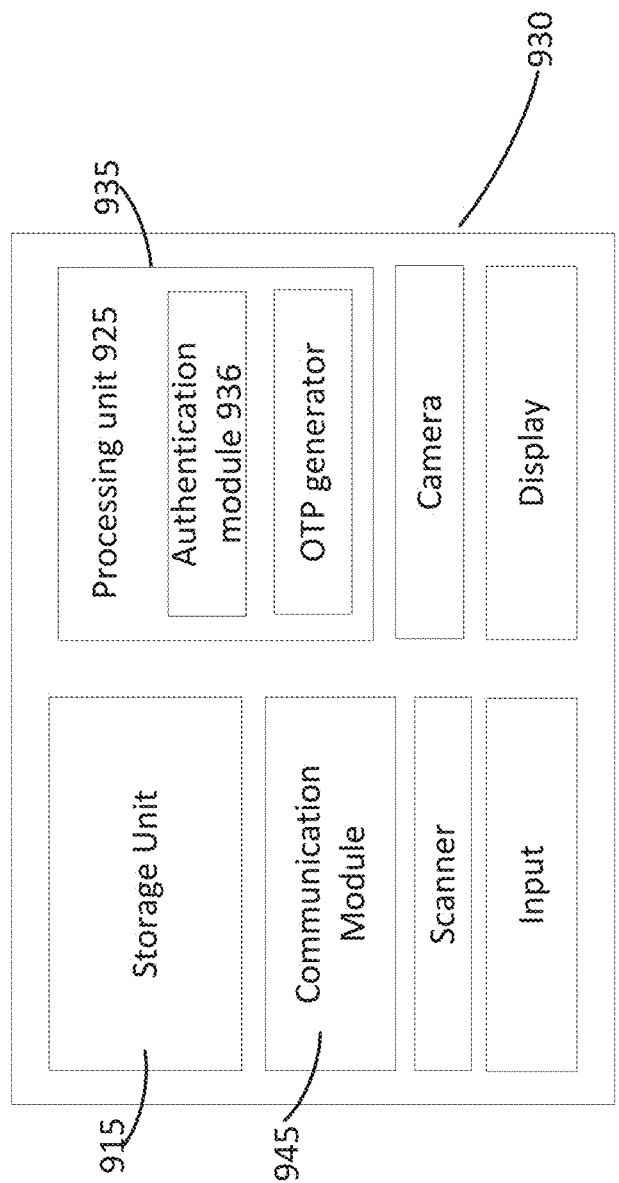
FIG. 9b is a functional block diagram showing an example of an authentication server device, in accordance with an example of the presently disclosed subject matter.

FIG. 8 is a flowchart of operations performed while using colleague mobile device for resetting a user's password, according to an example of the presently disclosed subject matter. In the event a user forgets a password needed to access a service (e.g. SP server 103) a password reset process can be initiated to enable the generation of a new password to enable the desired access. The presently disclosed subject matter provides a new technique for password reset using a colleague mobile device in an out-of-band process. The suggested type of password reset process reduces the risk of fraudulently regenerating a password for obtaining unauthorized access to a service.

Responsive to an indication made by a user that a password has been forgotten, a password reset process, using a colleague's mobile device, is initiated. The operations described in blocks 801 to 805 correspond to the operations described earlier with reference to blocks 401 to 405 and therefore are not described again in detail.

The challenge which is sent to colleague device can be provided according to the principles in any one of the examples described above with reference to FIG. 4, FIG. 7a and FIG. 7a.

At block 807 once a response to the challenge sent to colleague device 111 is received at AS 105, AS 105 is configured to determine, based on the response, whether or not to provide a new password to the user. A new password can be provided to the user at the colleague mobile device (block 809). The user can use the password to access the requested service.

According to the presently disclosed subject matter, using self imaging in an authentication process is not limited to authentication executed with the help of a colleague device, and can be also used in an authentication process using user device 101 and/or mobile device 107.

For example, the presently disclosed subject matter further contemplates a password reset process executed by user mobile device 107 according to the same principles described above with reference to FIG. 8. According to this example, a challenge provided to user mobile device 107 can require that the user captures a selfie of himself, possibly while performing a certain gesture. The generated image is sent from the mobile device to AS 105 and used in the authentication process as described above. Notably, in order to facilitate this type of challenge, images of the user (as well as various possible gesture types) are pre-stored in a data-repository accessible to AS 105.

FIG. 9a is a functional block diagram illustrating functional elements of authentication server 105, in accordance with an example of the presently disclosed subject matter.

FIG. 9b is a functional block diagram illustrating some functional elements of user mobile device 107, in accordance with an example of the presently disclosed subject matter.

As mentioned above, authentication server 105 as well as user mobile device 107 are computerized devices configured to execute various data processing operations and which are capable of communicating with various devices illustrated in FIG. 1 including authentication server 105 and notification server 109.

Authentication server comprises at least one processing unit 920 comprising (or otherwise operatively connected to) one or more computer processors and computer memory (e.g. including both transitory and non-transitory computer memory). The computer memory is configured with instructions to be executed by the computer processor for performing the operations described above with reference to FIGS. 2 to 8. According to one example, processing unit 920 comprises user authentication module 931 configured in general to receive an indication that a user is attempting to access SP server 103 and to execute an authentication process as described above. AS 105 can further comprise communication module 940 configured to communicate with various other computerized devices connected to network 110.

Authentication module 931 can comprise for example, an image processing module configured for executing image comparison as described above with reference to FIGS. 7a, 7b and 8. Authentication module 931 can further comprise a challenge generator configured to generate one or more challenges as well as challenge related data transmitted in some examples to user device 101 or user mobile device 107. For example, challenge generator can be configured to generate a QR code which is sent and displayed on user device 101 and scanned by user mobile device 107 as described above.

Authentication module 931 can comprise for example, a voice recognition processing module configured for executing authentication based on voice recognition as described above.

AS 105 can comprise or be otherwise accessible to data-repository 910 configured for storing various data. For example, data-repository 910 can be configured for storing the decision logic and rules for performing the authentication process as described above. Data-repository 910 can also comprise data identifying one or more colleague mobile devices which can be used during the authentication process. Data-repository 910 can further comprise user profiles of various users. The user profile can comprise personal information characterizing each user (e.g. name, address, login credentials, various access authorizations, transaction history (e.g. historical interacting operations with AS 105 and/or SP server 103), etc. The user profile can also comprise one or more images of the user and/or the colleague, that can be used during authentication as described above with reference to FIGS. 7a, 7b and 8. Data-repository 910 can be also used for storing voice records of different users which can be used during user authentication based on voice recognition.

Data-repository 910 can be configured as an integral part of AS 105 or configured as a separate storage unit connected over a communication link to AS 105. Data-repository 910 can comprise any appropriate permanent storage medium and may include, by way of non-limiting example, one or more disk units (DUs), also called "disk enclosures", comprising several disk drives (disks).

Turning to FIG. 9b, it illustrates an example of a functional block diagram of a user mobile device 107, in accordance with the presently disclosed subject matter. User mobile device 107 can be for example, a cellular communication device such as a Smartphone, a portable computer, a notepad, or the like. Device 900 comprises at least one processing unit 925 comprising one or more processors and a computer memory (e.g. including transitory and non-transitory computer memory). The user device can further include a display device (e.g. LCD or LED screen) and input device (e.g. keyboard mouse, touch pad, touch screen, microphone or the like) a (graphical) user interface and a communicating module 945 (possibly configured as several separate devices for the different networks) configured to provide communication with respective communication networks (e.g. LAN, Internet, cellular network, etc.).

Processing unit 925 can include various computer programs including for example, an operating system (e.g. Windows, Linux, Android, iOS etc.) and an Internet browsing application (e.g. Google Chrome, Safari, etc.). Processing unit 925 can further include authentication module 936 configured with instructions for executing the authentication process as described above with reference to FIGS. 2 to 8.

Device 900 can further comprise various additional functional elements including for example, a camera, an OTP generated and configured for locally generating an OTP, and a scanner (QR scanner).

Mobile device 107 and user device 101 are essentially similar devices, however while mobile device necessitates the ability to communicate with NS 109 user device 101 does not necessary have this ability.

The presently disclosed subject matter further contemplates a colleague user device 111 configured according to the principles disclosed herein. Colleague user device is essentially a device similar to user device 900 and can be likewise a cellular communication device such as a Smartphone, a portable computer, a notepad, or the like. Authentication module 936 can be specifically configured for handling the authentication of a different user. Thus, in addition to the functionalities discussed above with reference to FIG. 9b, authentication module 936 directed to operate on a colleague device mobile device, is further configured to execute operations related to the authentication of another user. For example, authentication module 936 directed to operate on a colleague device mobile device can include "colleague authentication module" configured to: receive a challenge from authentication server, receive a response to challenge via the user interface and send the response to authentication server. As explained above, initiation of authentication of a user with the help of a colleague device can be initiated by either authentication server 105 or colleague device 111. Thus, according to some examples "colleague authentication module" can be further configured to operate in "help a friend mode" which enables to initiate communication directly with AS 105 in case user mobile device 107 is not available.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a computer-readable non-transitory memory tangibly embodying a program of instructions executable by the computer for executing the method of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A system for authorizing access of a user device to a service provider (SP) server, comprising:
an authentication server computer device including at least one computer processor operatively connected to a computer memory and configured to:
responsive to a request to authenticate an identity of a user attempting to access the SP server via a first user device (UD), transmit a notification request to a notification server to cause the notification server to send a notification, including a token, to a second UD such that upon receipt of the notification the second UD sends data indicative of the token to the authentication server computer device, the notification server being physically distinct from the authentication server computer device;
responsive to a failure to receive the data indicative of the token from the second UD within a timeout limit, send instructions to the first UD to make the second UD ready for communicating with the authentication server computer device;
responsive to receiving information from the first UD indicating that the second UD is unavailable for communicating with the authentication server computer device, send instructions to the first UD such that the first UD displays instructions related to an authentication operation using a colleague UD and not including the second UD;
initiate the authentication operation, the authentication operation including a challenge presented on the colleague UD to be completed by the user to be granted access to the SP server;
determine an authorization-recommendation at least partly based on a response to the authentication operation received from the colleague UD; and
provide the authorization-recommendation to the SP server.

2. The system according to claim 1, wherein the notification is sent to the second UD to cause the second UD to be ready to receive a challenge from the authentication server computer device;
wherein following sending of the instructions to the first UD to make the second UD ready for communicating with the authentication server computer device, the authentication server computer device is configured to send the challenge to the second UD via a pathway excluding the notification server, to be completed at the second UD, to assist in authenticating the user.

3. The system according to claim 2, wherein upon successful completion of the challenge, the authentication server computer device is configured to:
provide the first UD with partial access to the SP server responsive to completion of the challenge;
repeatedly initiate attempts to send the notification to the second UD via the notification server; and
provide the first UD with full access once a response to the notification is received from the second UD at the authentication server computer device.

4. The system according to claim 2, wherein the authentication server computer device is configured in case of a failure to receive a response to the challenge, to send instructions to the first UD requesting to use an authentication method operated locally on the second UD.

5. The system according to claim 4, wherein the authentication server computer device is configured to send challenge-related data to be displayed on the first UD; wherein the challenge-related data is required to enable the authentication method operated locally on the second UD.

6. The system according to claim 1, wherein the authentication operation includes instructions to input in the colleague UD login credentials of the user.

7. The system according to claim 1, wherein the authentication operation includes instructions to input in the colleague UD login credentials of the user and login credentials of the colleague.

8. The system according to claim 1, wherein the authentication server computer device is configured to send challenge-related data to be displayed on the first UD; wherein the challenge-related data is required to complete the challenge.

9. The system according to claim 8, wherein the challenge-related data includes at least one QR code to be scanned by the colleague UD.

10. The system according to claim 1, wherein the authentication server computer device includes an image processor; the authentication operation includes a challenge including instructions to capture at least one selfie of both the user and the colleague; the image processor is configured to compare the at least one selfie with one or more previously-stored selfies and determine a degree of similarity between the selfie and the one or more previously-stored selfies, and provide the authorization-recommendation based on the degree of similarity.

11. The system according to claim 10, wherein the instructions to capture the at least one selfie further include instructions to request that one or both of the colleague and user perform one or more of: gesture at least one specified gesture while capturing the at least one selfie; and display a certain object while capturing the at least one selfie.

12. The system according to claim 1, wherein the authentication server computer device is configured to transmit the notification request to the notification server to cause the notification server to cause a challenge to be presented on a colleague UD to be completed by the user to be granted access to the SP server, wherein the challenge includes instructions requesting the user to speak into a microphone of the colleague UD to obtain a recorded speech; the authentication server computer device includes a voice recognition processor configured to determine a degree of similarity between the recorded speech and previously-recorded speech, wherein an authorization-recommendation is provided based on the degree of similarity between recorded speech received in response to the challenge including instructions requesting the user to speak into the microphone of the colleague UD, and the previously-recorded speech.

13. The system according to claim 1, wherein, in response to a failure to receive a response to the notification from the second UD, the authentication server computer device is configured to:
cause a query to be displayed on the first UD, the query asking whether the second UD is available for communicating with the authentication server computer device; and
receive from first UD information indicating whether the second UD is available or not.

14. The system according to claim 1, wherein the sending of data indicative of the token to the authentication server computer device by the second UD device is performed without user input.

15. The system according to claim 1, wherein the instructions sent to the first UD to make the second UD ready for communication with the authentication server computer device include instructions to make an authentication application on the second UD operative for initiating communicating with the authentication server computer device.

16. A computerized method of authorizing access of a first user device to a service provider (SP) server, comprising:
at an authentication server computer device:
responsive to a request to authenticate the identity of a user attempting to access the SP server via the first user device (UD), transmit a notification request to a notification server to cause the notification server to send a notification, including a token, via a first communication channel to a second UD such that upon receipt of the notification the second UD sends data indicative of the token to the authentication server computer device via a second communication channel, the first communication channel being distinct from the second communication channel, the second communication channel excluding the notification server;
in response to a failure to receive the data indicative of the token from the second UD within a timeout limit, performing at least the following operations:
sending instructions to the first UD to make the second UD ready to communicate with the authentication server computer device, and
responsive to receiving information from the first UD indicating that the second UD is unavailable to communicate with the authentication server computer device, sending instructions to the first UD such that the first UD displays instructions related to an authentication operation using a colleague UD and method not including the second UD;
initiating the authentication operation, the authentication operation including a challenge presented on the colleague UD to be completed by the user to be granted access to the SP server;
determining an authorization-recommendation at least partly based on a response to the authentication operation received from the colleague UD; and
providing the authorization-recommendation to the SP server.

17. The computerized method according to claim 16, wherein the notification is sent to the second UD to cause the second UD to be ready to receive one or more challenges, the method further comprising
wherein following sending instructions to the first UD to make the second UD ready to communicate with the authentication server computer device, sending a challenge by the authentication server computer device to the second UD via the second communication channel to be completed by the user to be granted access to the SP server.

18. The computerized method according to claim 17, further comprising, upon completion of the challenge:
providing the first UD with partial access to the SP server responsive to completion of the challenge;
repeatedly initiating attempts to send the notification to the second UD via the notification server; and
providing the first UD with full access once a response to the notification is received from the second UD.

19. The computerized method according to claim 18, further comprising:
in case of a failure to receive a response to the challenge, requesting the first UD to use an authentication method operated locally on the second UD.

20. The computerized method according to claim 19, further comprising: sending challenge-related data to be displayed on the first UD, the challenge-related data being required to enable said authentication method operated locally on the second UD.

21. The computerized method according to claim 16, wherein the authentication operation using the colleague UD includes instructions to input in the colleague UD login credentials of the user.

22. The computerized method according to claim 16, wherein the authentication operation using the colleague UD includes instructions to input in the colleague UD login credentials of the user and login credentials of the colleague.

23. The computerized method according to claim 16, further comprising sending challenge-related data to be displayed on the first UD, the challenge-related data being required to complete the challenge.

24. The computerized method according to claim 23, wherein the challenge-related data includes at least one QR code to be scanned by the colleague UD to obtain data needed to respond to the challenge.

25. The computerized method according to claim 16, wherein the challenge includes instructions to capture at least one selfie of the colleague and the user; the method further comprising:
comparing the at least one selfie with one or more previously-stored selfies;
determining a degree of similarity between the selfie and the one or more previously-stored selfies; and
providing the authorization-recommendation based on the degree of similarity between the selfie and the one or more previously-stored selfies.

26. The computerized method according to claim 25, wherein the instructions request that one or both of the colleague and user perform one or more of: gesture at least one specified gesture while capturing the at least one selfie; and display a certain object while capturing the at least one selfie.

27. The computerized method according to claim 16, wherein the authentication operation using the colleague UD includes a challenge presented on a colleague UD to be completed by the user to be granted access to the SP server; the challenge includes instructions requesting the user to speak into a microphone of the colleague UD to obtain recorded speech;
the method further comprising:
determining a degree of similarity between the recorded speech and previously-recorded speech; and
providing an authorization-recommendation based on the degree of similarity between the recorded speech and the previously-recorded speech.

28. The computerized method according to claim 16, further comprising:
in response to a failure to receive a response to the notification from the second UD, causing a query to be displayed on the first UD; the query asking whether the second UD is available for communicating with the authentication server computer device; and
receiving from the first UD the information indicating whether the second UD is available or not.

29. The computerized method according to claim 16, wherein the sending the instructions to the first UD to make the second UD ready for communicating with the authentication server computer device is responsive to receiving information indicating that the second UD is available to communicate with the authentication server computer device.

30. The computerized method according to claim 16, wherein the sending of data indicative of the token to the authentication server computer by the second UD device is performed without user input.

31. The computerized method according to claim 16, wherein the instructions sent to the first UD to make the second UD ready for communication with the authentication server computer device include instructions to make an authentication application on the second UD operative for initiating communication with the authentication server computer device.

32. An apparatus, comprising:
an authentication server (1) including at least one computer processor operatively connected to a computer memory, and (2) configured to:
responsive to (1) a request to authenticate an identity of a user attempting to access the SP server via the first user device (UD), (2) a failure to receive data indicative of a token from a second UD within a timeout limit, (3) and receiving an indication from the first UD indicating that a second UD is unavailable for communicating with the authentication server, transmit (1) information to the first UD such that the first UD displays information related to an authentication operating using a colleague UD, and (2) a notification request to a notification server to cause the notification server to send a notification, including the token, to the colleague UD such that the colleague UD, upon receipt of the notification, sends data indicative of the token to the authentication server, the notification server being physically distinct from the authentication server;
responsive to receiving from the colleague UD the data indicative of the token, sending a challenge to the colleague UD;
receive from the colleague UD a response to the challenge;
determine an authorization-recommendation at least partly based on the response to the challenge from the colleague UD; and
provide the authorization-recommendation to the SP server.

* * * * *

UNITED STATES PATENT AND TRADEMARK OFFICE
CERTIFICATE OF CORRECTION

PATENT NO. : 9,781,105 B2  
APPLICATION NO. : 14/703189  
DATED : October 3, 2017  
INVENTOR(S) : Avish Jacob Weiner Page 1 of 1

It is certified that error appears in the above-identified patent and that said Letters Patent is hereby corrected as shown below:

Column 24, Line 2:
"and method not including the second UD;" should be -- and not including the second UD; --

Signed and Sealed this
Twenty-seventh Day of March, 2018

Andrei Iancu
*Director of the United States Patent and Trademark Office*